United States Patent
Samodell

(10) Patent No.: US 7,280,331 B2
(45) Date of Patent: Oct. 9, 2007

(54) POWER RECONNECT AND VOLTAGE CONTROL

(75) Inventor: Ralph M. Samodell, Willoughby Hills, OH (US)

(73) Assignee: Lincoln Global, Inc., City of Industry, CA (US)

( * ) Notice: Subject to any disclaimer, the term of this patent is extended or adjusted under 35 U.S.C. 154(b) by 408 days.

(21) Appl. No.: 11/069,227

(22) Filed: Mar. 1, 2005

(65) Prior Publication Data

US 2006/0198171 A1 Sep. 7, 2006

(51) Int. Cl.
*H02H 7/00* (2006.01)

(52) U.S. Cl. .................................... 361/90
(58) Field of Classification Search .............. 361/90
See application file for complete search history.

(56) References Cited

U.S. PATENT DOCUMENTS

| | | | | |
|---|---|---|---|---|
| 4,234,904 A | 11/1980 | Fahlesson | ................ | 361/165 |
| 4,438,387 A | 3/1984 | Rohatin | ................ | 323/260 |
| 4,636,702 A * | 1/1987 | Hedges | ................ | 318/729 |
| 4,710,841 A | 12/1987 | Bottrell | ................ | 361/23 |
| 4,800,460 A | 1/1989 | Yin | ................ | 361/340 |
| 4,843,533 A | 6/1989 | Roof et al. | ................ | 363/55 |
| 4,953,052 A * | 8/1990 | Cartlidge et al. | ................ | 361/20 |
| 5,200,877 A | 4/1993 | Betton et al. | ................ | 361/92 |
| 5,296,997 A | 3/1994 | Betton et al. | ................ | 361/92 |
| 5,319,514 A | 6/1994 | Walsh et al. | ................ | 361/59 |
| 5,561,596 A * | 10/1996 | Hemena et al. | ................ | 363/50 |
| 5,903,426 A | 5/1999 | Ehling | ................ | 361/119 |
| 6,353,523 B1 | 3/2002 | Niv et al. | ................ | 361/79 |

\* cited by examiner

*Primary Examiner*—Stephen W. Jackson
(74) *Attorney, Agent, or Firm*—Fay Sharpe LLP

(57) ABSTRACT

In one aspect, a power connect device receives ac line voltage and provides ac load voltage to a load device. In one embodiment, the power connect device includes: a connect panel, a transformer circuit, a high voltage relay, a rectifier, and a voltage protection circuit. In one aspect, the transformer circuit includes first, second, and third transformers each with a primary winding, a high voltage secondary winding, and a low voltage secondary winding. In several embodiments, methods protect the load device from an over or under voltage conditions on the ac load voltage using the power connect device. The power connect device is reconfigurable for three phase and single phase operation. The power connect device is also reconfigurable for multiple line voltage levels.

60 Claims, 10 Drawing Sheets

POWER RECONNECT AND VOLTAGE CONTROL

BACKGROUND

The exemplary embodiments described herein relate to a power reconnect and voltage protection device that adapts load equipment to multiple types of input power sources. It finds particular application in conjunction with adapting a transportable robotic welding cell to a variety of input power sources, and will be described with particular reference thereto. However, it is to be appreciated that the present exemplary embodiment is also amenable to other like applications.

There are multiple types of electrical power that may be provided by public electrical utilities or locally generated for operating equipment in residential or commercial environments. For example, some exemplary types of three phase electrical power may have nominal voltage levels of 208-240 Vac, 480 Vac, 600 Vac, or some other nominal voltage level. Additionally, single phase electrical power may be provided at a nominal voltage level of 208-240 Vac, 480 Vac, 600 Vac, or some other nominal voltage level.

Load devices may be rated to operate on three phase electrical power at nominal voltage levels of 200 Vac, 208 Vac, 230 Vac, 208-230 Vac, 200-240 Vac, 460 Vac, 575 Vac, or some other nominal voltage level. These load devices may be desired to be located in an environment already having three phase electrical power at some nominal voltage other than the rated voltage. This typically leaves one with two alternatives: 1) providing three phase electrical power at the rated voltage or 2) providing an equivalent load device rated for the three phase electrical power that is currently available.

Additionally, load devices may be rated to operate on single phase electrical power at nominal voltage levels of 200 Vac, 208 Vac, 230 Vac, 208-230 Vac, 200-240 Vac, or some other nominal voltage level. These load devices may be desired to be located in an environment already having single phase electrical power at some nominal voltage other than the rated voltage. This typically leaves one with three alternatives: 1) providing single phase electrical power at the rated voltage, 2) providing an equivalent load device rated for the single phase electrical power that is currently available, or 3) forego using the load device in the desired environment.

For example, commercial equipment, such as a transportable robotic welding cell, may be rated to operate on either three phase or single phase electrical power, for example, using a nominal voltage of 200-240 Vac+10%/−15% or some other nominal voltage level and/or range. If the equipment is rated to operate on three phase electrical power, one may find, for example, that only 480 Vac/3Ø, 600 Vac/3Ø, or some other nominal voltage level outside the rated range is currently available. If the equipment is rated to operate on single phase electrical power, one may find, for example, that only 480 Vac/1Ø, 600 Vac/1Ø, or some other nominal voltage outside the rated range is currently available. Under these circumstances, the commercial equipment owner may have to purchase multiple models of the same equipment just so he/she can operate the equipment in the desired location. Some other alternative are to pay a public electrical utility to install the required electrical power, purchase a generator to provide the required electrical power, or forego using the equipment in desired environment.

Accordingly, there is a need for an adapter that can be reconfigured in order to interface equipment with multiple nominal voltages for input power sources that may be available in residential or commercial environments. This is particularly needed for transportable equipment and other equipment that may be re-located from time to time to different environments that may have different nominal voltages for input power sources.

BRIEF DESCRIPTION

In one aspect, a power connect device adapted to receive ac line voltage and provide ac load voltage to a load device is provided. In one embodiment, the power connect device includes: a connect panel adapted to receive at least two of first, second, and third input power conductors that provide the ac line voltage to the connect panel, a transformer circuit in communication with the connect panel and adapted to produce a first ac load voltage at a first nominal load voltage level, a high voltage relay with first, second, and third high voltage relay contacts, a rectifier in communication with the transformer circuit and adapted to receive the second ac load voltage and produce a dc load voltage at a nominal dc voltage level, and a voltage protection circuit in communication with the rectifier and the high voltage relay. The ac line voltage having a first nominal line voltage level or a second nominal line voltage level depending on a source of the ac line voltage. In one embodiment, the transformer circuit includes: a first transformer with a first primary winding, a first high voltage secondary winding, and a first low voltage secondary winding, a second transformer with a second primary winding, a second high voltage secondary winding, and a second low voltage secondary winding, and a third transformer with a third primary winding, a third high voltage secondary winding, and a third low voltage secondary winding. The first, second, and third primary windings are adapted to receive the ac line voltage, wherein the first, second, and third high voltage secondary windings are adapted to produce the first ac load voltage. The first, second, and third low voltage secondary windings are adapted to produce a second ac load voltage at a second nominal load voltage level. The second nominal load voltage level is less than the first nominal load voltage level. The first, second, and third high voltage relay contacts are normally open. The first high voltage relay contact is in communication with the first high voltage secondary winding and adapted to open and close a first high voltage load circuit providing the first ac load voltage from the first high voltage secondary winding to the load device. The second high voltage relay contact is in communication with the second high voltage secondary winding and adapted to open and close a second high voltage load circuit providing the first ac load voltage from the second high voltage secondary winding to the load device. The third high voltage relay contact is in communication with the third high voltage secondary winding and adapted to open and close a third high voltage load circuit providing the first ac load voltage from the third high voltage secondary winding to the load device. The voltage protection circuit is adapted to receive the dc load voltage from the rectifier. The voltage protection circuit determines if a present nominal dc voltage level for the dc load voltage is outside a predetermined range and disables the high voltage relay until the voltage protection circuit determines the present nominal dc voltage level is within the predetermined range for a predetermined time.

In another embodiment, the power connect device includes: a connect panel adapted to receive first and second input power conductors that provide the ac line voltage to the connect panel, a transformer circuit in communication with the connect panel and adapted to produce a first ac load voltage at a first nominal load voltage level, a first secondary relay with a first secondary relay contact, a rectifier in communication with the transformer circuit and adapted to receive the second ac load voltage and produce a dc load voltage at a nominal dc voltage level, and a voltage protection circuit in communication with the rectifier and the first secondary relay. The ac line voltage having a first nominal line voltage level or a second nominal line voltage level depending on a source of the ac line voltage. In one embodiment, the transformer circuit includes a first transformer with a first primary winding, a first secondary winding adapted to produce the first ac load voltage, and a second secondary winding adapted to produce a second ac load voltage at a second nominal load voltage level. The second nominal load voltage level is less than the first nominal load voltage level. The first secondary relay contact is normally open. The first secondary relay contact is in communication with the first secondary winding and adapted to open and close a first ac load circuit providing the first ac load voltage from the first secondary winding to the load device. The voltage protection circuit is adapted to receive the dc load voltage from the rectifier. The voltage protection circuit determines if a present nominal dc voltage level for the dc load voltage is outside a predetermined range and disables the first secondary relay until the voltage protection circuit determines the present nominal dc voltage level is within the predetermined range for a predetermined time.

In another aspect, a method of protecting a: load device from an overvoltage condition on at least a first ac load voltage provided to the load device is provided. In one embodiment, the method includes: a) providing a power connect device adapted to receive an ac line voltage and provide the first ac load voltage to the load device, b) connecting the power connect device to the ac line voltage, wherein the ac line voltage is at a first nominal line voltage level or a second nominal line voltage level depending on the source of the ac line voltage, wherein the first nominal line voltage level is less than the second nominal line voltage level, c) producing the first ac load voltage at a first nominal load voltage level and a second ac load voltage at a second nominal load voltage level from the ac line voltage, wherein the second nominal load voltage level is less than the first nominal load voltage level, d) producing a dc load voltage at a nominal dc voltage level from the second ac load voltage, e) determining if a present nominal dc voltage level for the dc load voltage exceeds a predetermined threshold, and f) if the present nominal dc voltage level exceeds the predetermined threshold, disabling connection of the first ac load voltage to the load device, otherwise, connecting the first ac load voltage to the load device after the present nominal dc voltage level does not exceed the predetermined threshold for a predetermined time.

In another aspect, a method of protecting a load device from an undervoltage condition on at least a first ac load voltage provided to the load device is provided. In one embodiment, the method includes: a) providing a power connect device adapted to receive an ac line voltage and provide the first ac load voltage to the load device, b) connecting the power connect device to the ac line voltage, wherein the ac line voltage is at a first nominal line voltage level or a second nominal line voltage level-depending on the source of the ac line voltage, wherein the first nominal line voltage level is less than the second nominal line voltage level, c) producing the first ac load voltage at a first nominal load voltage level and a second ac load voltage at a second nominal load voltage level from the ac line voltage, wherein the second nominal load voltage level is less than the first nominal load voltage level, d) producing a dc load voltage at a nominal dc voltage level from the second ac load voltage, e) determining if a present nominal dc voltage level for the dc load voltage is less than a predetermined threshold, and f) if the present nominal dc voltage level is less than the predetermined threshold, disabling connection of the first ac load voltage to the load device, otherwise, connecting the first ac load voltage to the load device after the present nominal dc voltage level is not less than the predetermined threshold for a predetermined time.

DETAILED DESCRIPTION

Figure 1:
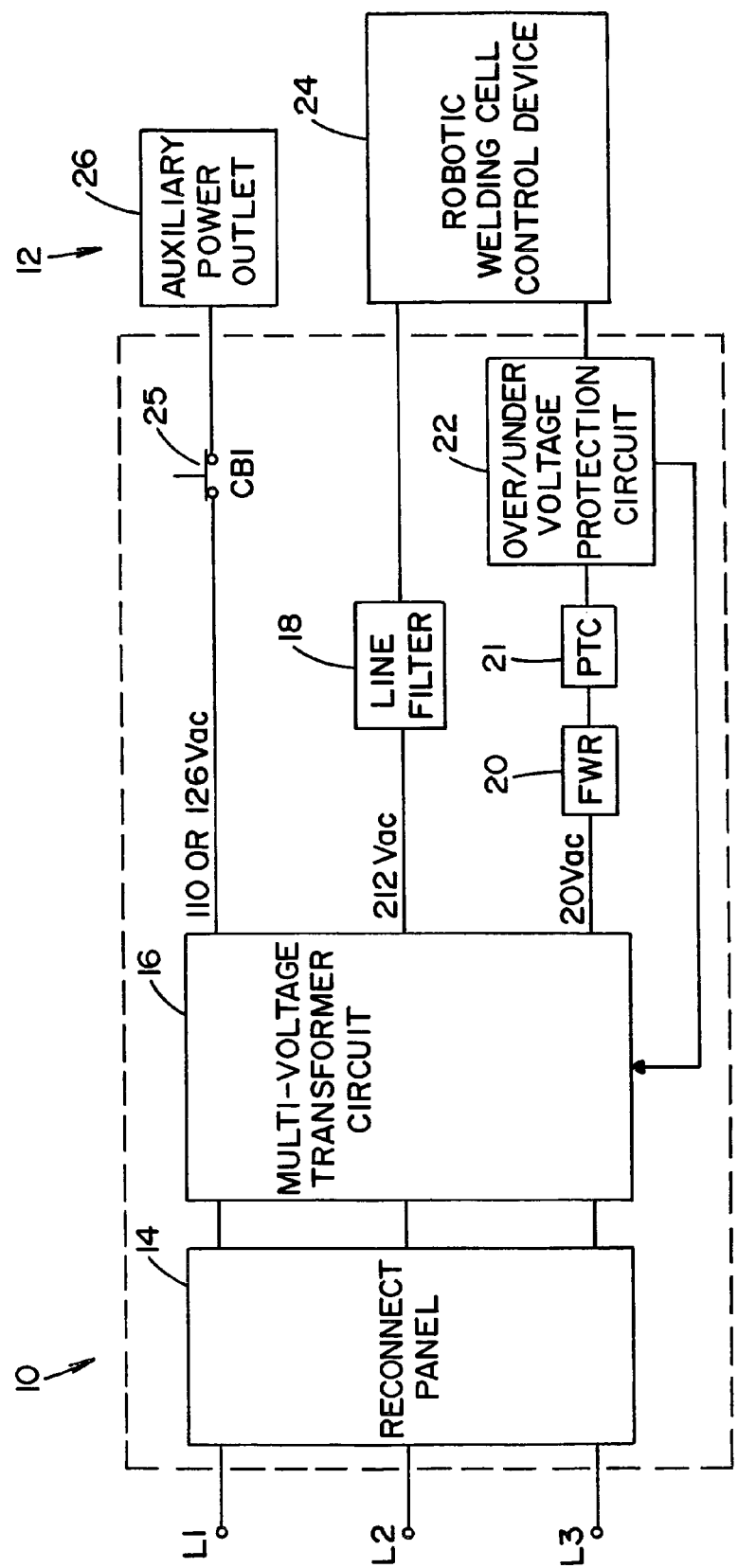
FIG. 1 is block diagram of an embodiment of a power reconnect and voltage protection device.

With reference to FIG. 1, an embodiment of a power reconnect and voltage protection device 10 receives a three phase line voltage L1, L2, L3 and provides a high voltage three phase load-voltage (e.g., 212 Vac), an auxiliary single phase load voltage (e.g., 110 or 126 Vac), and a dc load voltage (e.g., 20 Vdc) to a load device 12. This is useful when the load device is rated to operate on three phase electrical power at a nominal voltage level of 200-240 Vac. The three phase line voltage L1, L2, L3 may, for example, have a nominal voltage level of 230 Vac, 460 Vac, 575 Vac, or some other nominal voltage level.

The line voltage may, for example, have a nominal frequency of 50 Hz, 60 Hz, or some other nominal frequency. It is anticipated that the nominal frequency of the ac load voltages will be relatively the same as the nominal frequency of the line voltage. However, in other embodiments, a frequency conversion component may be added where a particular frequency is desired for one or more of the ac load voltages.

The power reconnect and voltage protection device 10 includes a reconnect panel 14, a multi-voltage transformer circuit 16, a line filter 18, a full wave rectifier 20, a positive temperature coefficient (PTC) device 21, an over/under voltage protection circuit 22, and a circuit breaker CB1 25.

In the embodiment being described, the load device 12 includes a robotic welding cell control device 24 and an auxiliary power outlet 26.

The reconnect panel 14 receives the three phase line voltage L1, L2, L3 and communicates reconnect line voltage to the multi-voltage transformer circuit 16. The multi-voltage transformer circuit 16 provides a low voltage three phase load voltage (e.g., 20 Vac) to the full wave rectifier 20. The full wave rectifier 20 converts the low voltage three phase load voltage to the dc load voltage and provides the dc load voltage to the over/under voltage protection circuit 22 through the PTC device 21. The PTC device 21 is optional and provides thermal current overload protection to the over/under voltage protection circuit 22 and subsequent load circuits. It should be noted that alternate types of rectifiers and other types of devices that can convert the low voltage load voltage to the dc load voltage may be implemented in place of the full wave rectifier.

The over/under voltage protection circuit 22 monitors the voltage level of the dc load voltage and, if the voltage level is outside a predetermined range (e.g., less than a first predetermined threshold (e.g., about 16 Vdc) or greater than a second predetermined threshold (e.g., about 30 Vdc)), disables the dc load voltage to the robotic welding cell control device 24. The over/under voltage protection circuit 22 is also in communication with the multi-voltage transformer circuit 16 and, if the dc load voltage is within the predetermined range, enables the multi-voltage transformer circuit 16 to provide the high voltage three phase load voltage to the robotic welding cell control device 24 via the line filter 18. Additionally, if the dc load voltage is within the predetermined range, the over/under voltage protection circuit 22 enables the multi-voltage transformer circuit 16 to provide the auxiliary single phase load voltage to the auxiliary power outlet 26 through the circuit breaker CB1 25. The circuit breaker CB1 25 provides overload protection to the auxiliary power outlet.

Standard load voltages are provided to the load device 12 when the reconnect panel 14 is connected to any one of multiple levels of three phase line voltage L1, L2, L3 by changing jumper or discreet wiring connections associated with the reconnect panel 14 to correspond to the connected line voltage level. The corresponding wiring connections reconnect primary sections of transformers within the multi-voltage transformer circuit 16 so that the standard load voltages are provided for the connected line voltage level. The reconnect panel 14 may have different jumper or discreet wiring connection configurations for each of multiple three phase line voltage levels (e.g., nominal voltage levels of 230 Vac, 460 Vac, 575 Vac, etc.). In the event the dc load voltage produced by the connected line voltage level is higher or lower than the predetermined range, the reconnect panel 14 may be improperly configured. This creates the overvoltage condition on the dc load voltage. The over/under voltage protection circuit 22 senses the overvoltage condition and effectively disables the load voltages from being connected to the load device 12. The primary coils are designed to thermally withstand any misconnection over voltage until the elevated saturation current clears the line fuses.

As an option, the power reconnect and voltage protection circuit 10 may also be reconnected to receive a single phase line voltage (e.g., L1, L2) and provide a high voltage single phase load voltage (e.g., 212 Vac), an auxiliary single phase load voltage (e.g., 126 Vac), and a dc load voltage (e.g., 20 Vdc) to the load device 12. This is useful when the load device is rated to operate on single phase electrical power at a nominal voltage level of 200-240 Vac. The single phase line voltage may, for example, have a nominal voltage level of 230 Vac, 460 Vac, 575 Vac, or some other nominal voltage level. The single phase line voltage may, for example, have a nominal frequency of 50 Hz, 60 Hz, or some other nominal frequency.

The reconnect panel 14 receives the single phase line voltage and communicates reconnect line voltage to the multi-voltage transformer circuit 16. The multi-voltage transformer circuit 16 provides a low voltage auxiliary single phase load voltage (e.g., 20 Vac) to the full wave rectifier 20. The full wave rectifier 20 converts the low voltage auxiliary single phase load voltage to the dc load voltage and provides the dc load voltage to the over/under voltage protection circuit 22. For single phase operation, additional filtering (e.g., additional capacitance) may be connected across the dc load voltage in either the full wave rectifier 20 or the over/under voltage protection circuit 22 to reduce ripple associated with full wave rectification of single phase electrical power. The over/under voltage protection circuit 22 senses the voltage level of the dc load voltage and operates as described above for three phase operation.

Standard load voltages are provided to the load device 12 when the reconnect panel 14 is connected to any one of multiple levels of single phase line voltage by changing jumper or discreet wiring connections associated with the reconnect panel 14 to correspond to the connected line voltage level. The corresponding wiring connections reconnect the primary and secondary sections of transformers within the multi-voltage transformer circuit 16 so that the standard load voltages are provided for the connected line voltage level. The reconnect panel 14 may have different jumper or discreet wiring connection configurations for each of multiple single phase line voltage levels (e.g., nominal voltage levels of 230 Vac, 460 Vac, 575 Vac, etc.).

Note that the same power reconnect and voltage protection device 10 may be used to connect a three phase load device to multiple three phase input voltage levels and a single phase load device to multiple single phase input voltage levels.

Figure 2:
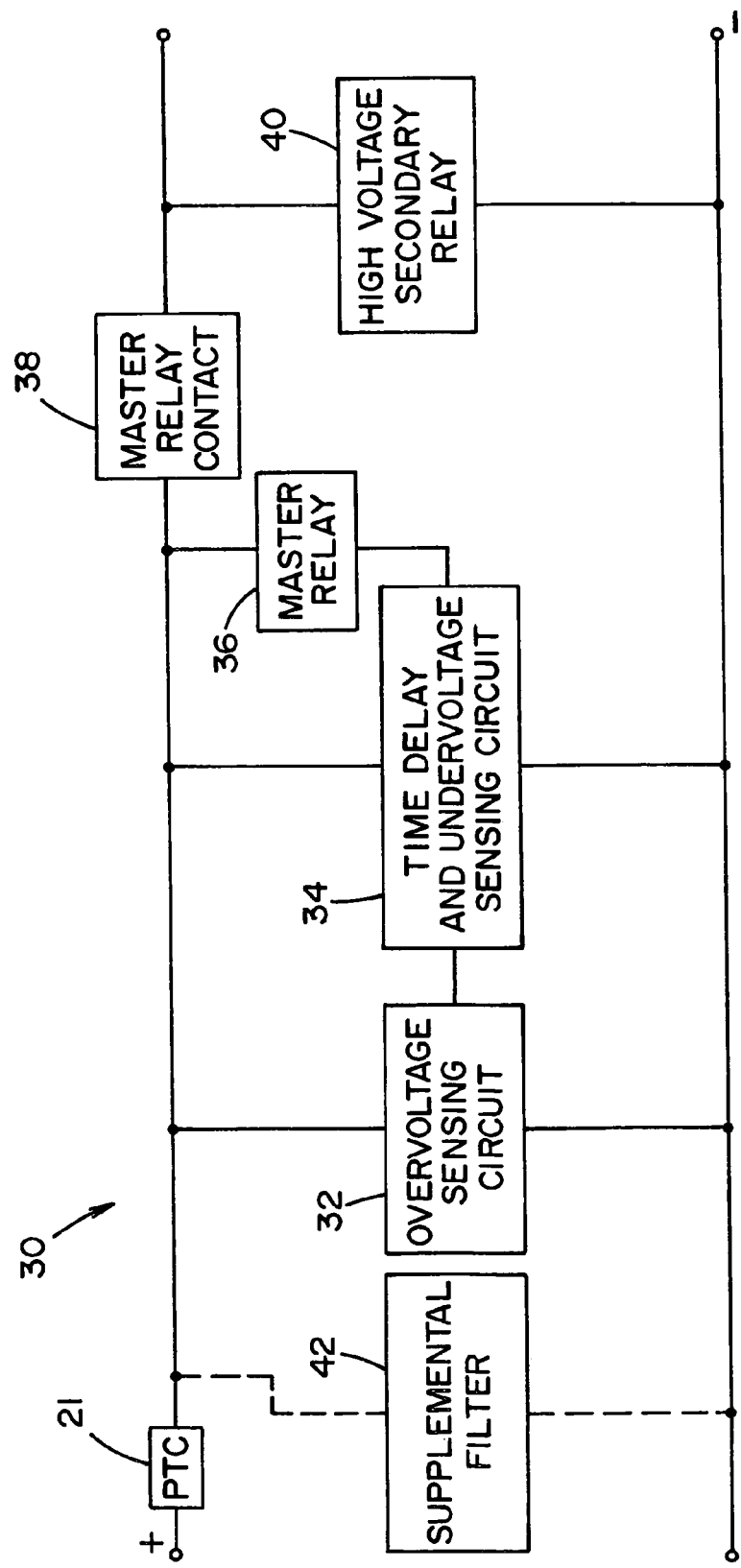
FIG. 2 is a block diagram of an embodiment of an overvoltage protection and relay circuit.

With reference to FIG. 2, an embodiment of an over/undervoltage protection and relay circuit 30 includes the PTC device 21, an overvoltage sensing circuit 32, a time delay and undervoltage sensing circuit 34, a master relay 36, a first master relay contact 38, a high voltage secondary relay 40, and a supplemental filter 42. The embodiment being described is related to the over/undervoltage protection circuit 22 and a portion of the multi-voltage transformer circuit 16 of FIG. 1. The PTC device 21 is optional and provides thermal current overload protection to the over/under voltage protection and relay circuit 30 and subsequent load circuits. The supplemental filter 42 is connected for single phase operation to reduce ripple associated with full wave rectification of single phase electrical power. The supplemental filter 42 is disconnected, or significantly reduced, for three phase operation.

The over/under voltage protection and relay circuit 30 receives a dc load voltage-from, for example, the full wave rectifier 20 (FIG. 1) through the PTC device 21. The dc load voltage may, for example, have a nominal voltage level of 20 Vdc or some other nominal voltage level. The overvoltage sensing circuit 32 monitors the voltage of the dc load voltage and, if the voltage is within a predetermined range (e.g., greater than a first predetermined threshold (e.g., about 16 Vdc) or less than a second predetermined threshold (e.g., about 30 Vdc)), it allows the time delay and undervoltage sensing circuit 34 to turn on after a predetermined time (e.g., 30-40 milliseconds) and then provides a current sinking signal to the master relay 36 which energizes its coil. When the master relay 36 is energized the first master relay contact 36 (which is normally open (NO)) closes. This applies the dc load voltage to the positive (+) output terminal of the over/under voltage protection and relay circuit 30 and, for example, to the robotic welding cell control device 24 (FIG. 1). When the first master relay contact 36 closes, the dc load voltage is also applied to the high voltage secondary relay 40 to energize its coil.

Another NO master relay contact associated with the multi-voltage transformer circuit 16 (FIG. 1) enables the auxiliary single phase load voltage to the auxiliary power outlet 26 (FIG. 1). Similarly, NO high voltage secondary relay contacts associated with the multi-voltage transformer circuit 16 (FIG. 1) enable the high voltage ac load voltage to the robotic welding cell control device 24 (FIG. 1).

Conversely, if the dc load voltage exceeds the predetermined threshold, the overvoltage sensing circuit 32 disables the time delay and undervoltage sensing circuit 34. This causes the time delay and undervoltage sensing circuit 34 to disable and/or de-energize the master relay 36 which in turn disables and/or de-energizes the high voltage secondary relay 40. The sensed high voltage condition essentially disables the dc load voltage and high voltage ac load voltage from the robotic welding cell control device 24 (FIG. 1) and the auxiliary single phase load voltage from the auxiliary power outlet 26 (FIG. 1). In addition, if the input supply voltage is too low to energize the master relay 36 (e.g., 230V input power applied to 460V input power connections), the secondary supplied loads are applied. Thus, the over/under voltage protection and relay circuit 30 serves as an undervoltage protection device.

Figure 3:
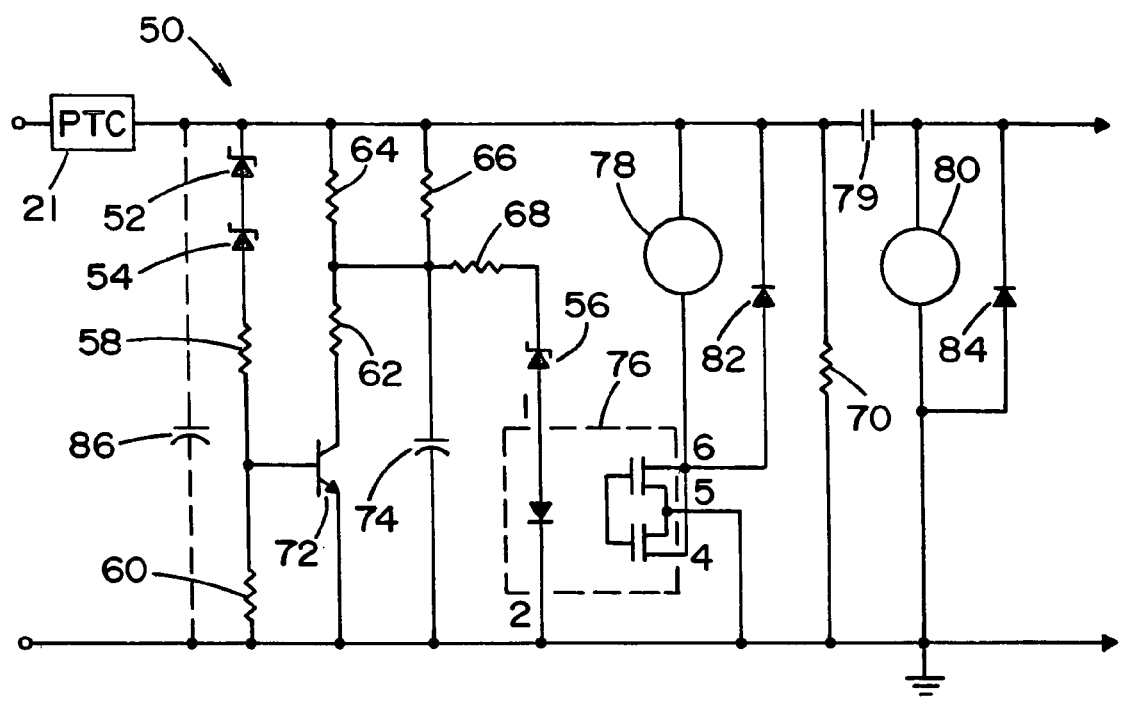
FIG. 3 is a schematic diagram of an embodiment of an overvoltage protection and relay circuit.

With reference to FIG. 3, another embodiment of an over/under voltage protection and relay circuit 50 includes the PTC device 21, a first zener diode 52, a second zener diode 54 (for overvoltage sensing), a third zener diode 56 (for time delay and undervoltage sensing), a first resistor 58, a second resistor 60, a third resistor 62, a fourth resistor 64, a fifth resistor 66, a sixth resistor 68, a seventh resistor 70, a transistor 72, a time delay capacitor 74, a solid state relay (SSR) 76, a master relay 78, a first master relay contact 79, a high voltage secondary relay 80, a first diode 82, a second diode 84, and a supplemental capacitor 86. The embodiment being described is related to the over/under voltage protection circuit 22 and a portion of the multi-voltage transformer circuit 16 of FIG. 1. The PTC device 21 is optional and provides with thermal overload protection to the over/under voltage protection and relay circuit 50 and subsequent load circuits. The supplemental capacitor 86 is connected for single phase operation to reduce ripple associated with full wave rectification of single phase electrical power. The supplemental capacitor 86 is disconnected, or significantly reduced, for three phase operation.

The first and second zener diodes 52, 54, for example, may be 15 V, 5 watt devices. The third zener diode 56, for example, may be a 10 V, 5 watt device. The first resistor 58, for example, may be a 7.5 kOhm, 0.25 watt device. The second resistor 60, for example, may be a 10 kOhm, 0.25 watt device. The third resistor 62, for example, may be a 1 kOhm, 0.25 watt device. The fourth and fifth resistors 64, 66, for example, may be 15 kOhm, 0.25 watt devices. The sixth resistor 68, for example, may be a 750 Ohm, 0.25 watt device. The seventh resistor 70, for example, may be a 22.1 kOhm, 0.25 watt device. The transistor 72, for example, may be a 2N4401, 0.5 amp, 40 V device. The time delay capacitor 74, for example, may be a 4.7 μF, 35 V device. The SSR 76, for example, may be an optocoupler device. The master and high voltage secondary relays 78, 80, for example, may be 24 Vdc, triple pole, double throw (3PDT) devices. The first and second diode 82, 84, for example, may be 1 amp, 400 V devices.

The first and second zener diodes 52, 54, first and second resistors 58, 60, and transistor 72 operate to sense when the dc load voltage at the input of the overvoltage protection and relay circuit 50 is in an overvoltage condition. The first and second zener diodes 52, 54 established the predetermined threshold for the overvoltage condition. When an overvoltage condition exists, the transistor 72 is biased to turn on. When an overvoltage condition does not exist, the transistor 72 is off.

The third, fourth, fifth, and sixth resistors, 62, 64, 66, 68, time delay capacitor 74, third zener diode 56, and SSR 76 form a time delay and undervoltage sensing circuit with a low voltage threshold that controls the master relay 78. When the transistor is off, the time delay capacitor 74 charges until the corresponding increasing voltage exceeds the low voltage threshold formed by the third zener diode 56 and the optical diode portion of the SSR 76. After the charging delay time (nominally 30-40 milliseconds), the current through the optical diode portion of the SSR 76 is high enough to turn on the SSR and close its contact portion. This requires a DC load voltage greater than about 16 Vdc to activate SSR. When the contact portion of the SSR 76 closes, a current sinking path for the master relay 78 is provided through the SSR 76. This energizes the coil of the master relay 78 and closes the first master relay contact 79. This applies the dc load voltage to the positive (+) output terminal of the over/under voltage protection and relay circuit 50. When the first master relay contact 79 closes, the dc load voltage is also applied to the high voltage second relay 80 to energize its coil.

Conversely, when the transistor 72 is on (i.e., overvoltage condition), the time delay and undervoltage sensing circuit is disabled because charge on the time delay capacitor 74 is drained through the transistor 72. The disabled time delay and undervoltage sensing circuit provides a filter for momentary over voltage transients, but, for sustained over voltage, disables and/or de-energizes the master relay 78. The master relay 78, in turn, disables and/or de-energizes the high voltage secondary relay 80 while the overvoltage condition exists.

Figure 4:
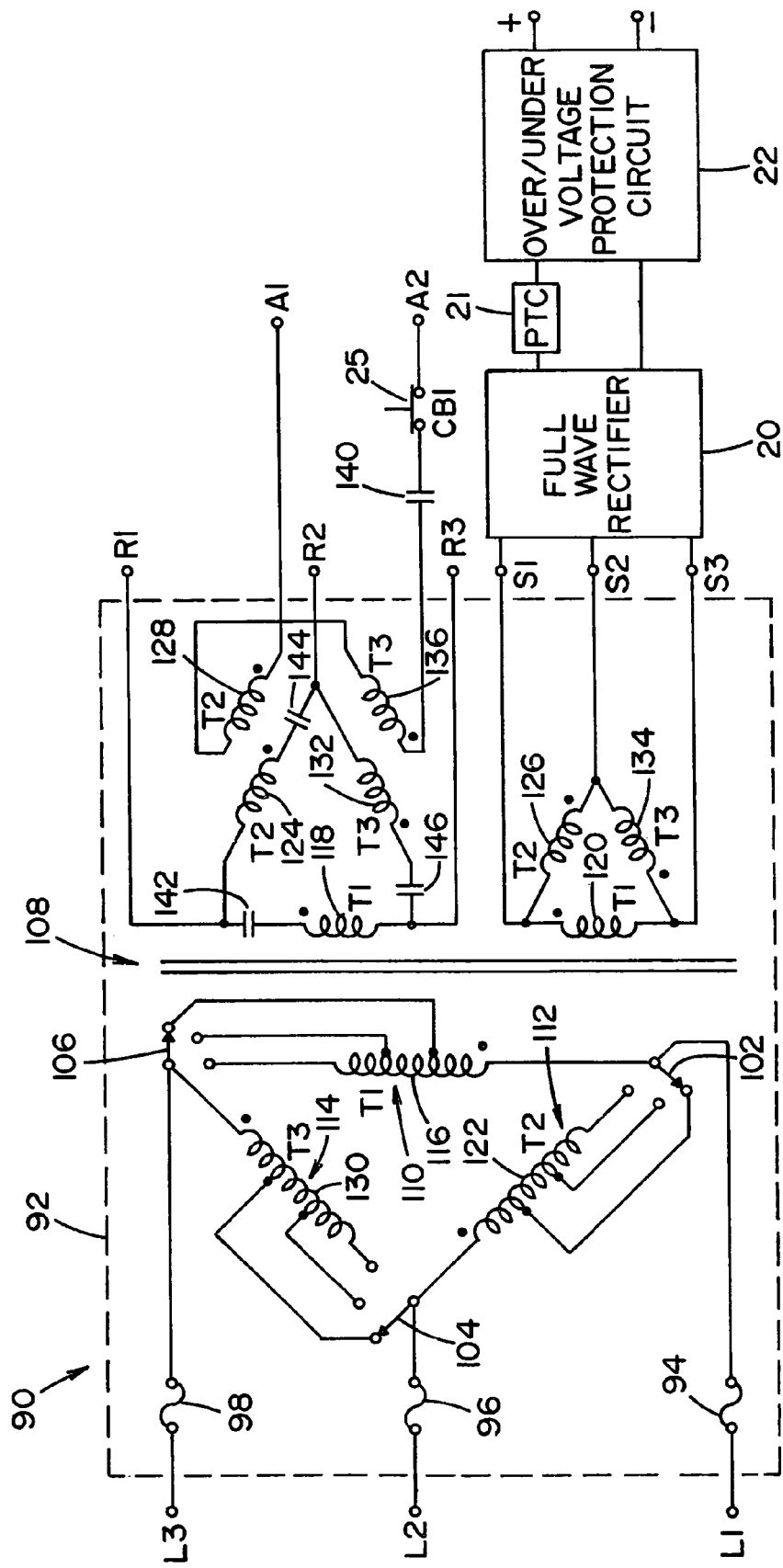
FIG. 4 is a schematic diagram of an embodiment of a power reconnect and voltage protection device with an embodiment of a reconnect transformer circuit configured for three phase operation.

With reference to FIG. 4, an embodiment of a power reconnect and voltage protection device 90 includes the full wave rectifier 20, PTC device 21, over/under voltage protection circuit 22, and a reconnect transformer circuit 92. The reconnect transformer circuit 92 includes a first fuse 94, a second fuse 96, a third fuse 98, a first selected line voltage jumper 102, a second selected line voltage jumper 104, a third selected line voltage jumper 106, and a multi-voltage transformer circuit 108. The multi-voltage transformer circuit 108 includes a first transformer 110, a second transformer 112, and a third transformer 114. The first transformer 110 includes a first primary winding 116, a first high voltage secondary winding 118, a first low voltage secondary winding 120, and an unused auxiliary single phase secondary winding (not shown). The second transformer 112 includes a second primary winding 122, a second high voltage secondary winding 124, a second low voltage secondary winding 126, and a first auxiliary single phase secondary winding 128. The third transformer 114 includes a third primary winding 130, a third high voltage secondary winding 132, a third low voltage secondary winding 134, and a second auxiliary single phase secondary winding 136.

The reconnect transformer circuit 92 also includes a second master relay contact 140, the circuit breaker CB1 25, a first high voltage secondary relay contact 142, a second high voltage secondary relay contact 144, and a third high voltage secondary relay contact 146.

The reconnect transformer circuit 92 is configured for three phase operation. As shown, the first, second, and third primary windings 116, 122, 130 are connected in a delta configuration, the first, second, and third high voltage secondary windings 118, 124, 132 (in combination with the first, second, and third high voltage relay contacts 142, 144, 146) are connected in a delta configuration, the first, second, and third low voltage secondary windings 120, 126, 134 are connected in a delta configuration, and the first and second auxiliary single phase secondary windings 128, 136 are connected in,an open wye configuration.

The reconnect transformer circuit 92 receives three phase line voltage L1, L2, L3 at the first, second, and third fuses 94, 96, 98, respectively. The fuses, for example, may be 20 amp devices. The fused three phase line voltage is provided to the first, second, and third primary windings 116, 122, 130 via the first, second, and third selected line voltage jumpers 102, 104, 106, respectively. The first, second, and third selected line voltage jumpers 102, 104, 106 may be either switches, jumpers or discrete wiring connections that are reconnected in different configurations to correspond to different three phase line voltage levels (e.g., 230 Vac, 460 Vac, and 575 Vac).

In the embodiment being described, each of the primary windings 116, 122, 130 may, accordingly, have first and second end terminals and first and second tap terminals, wherein the size of the coil and the position of the tap terminals are related to the three phase line voltage levels of 230 Vac, 460 Vac, and 575 Vac. The first and-second end terminals are designated for connection of the fused three phase line voltage when the nominal voltage level is 575 Vac. The first end terminal and second tap terminal are designated for connection of the fused three phase line voltage when the nominal voltage level is 460 Vac. The first end terminal and first tap terminal are designated for connection of the fused three phase line voltage when the nominal voltage level is 230 Vac. Of course, more or less three phase line voltages can be accommodated by increasing or decreasing the number of tap terminals in the first, second, and third primary windings 116, 122, 130 to which the first, second, and third selected line voltage jumpers 102, 104, 106 may be connected. Additionally, other nominal voltage levels for the three phase line voltage can be accommodated by correlating selection of the size of the coil and/or position of tap terminals with the desired nominal voltage levels.

More specifically, the fused three phase line voltage is provided to corresponding common terminals associated with the first, second, and third selected line voltage jumpers. 102, 104, 106 and to the first ends of third, second, and first primary windings 116, 122, 130, respectively. In the embodiment being described, when the three phase line voltage is to be connected to a nominal voltage level of 575 Vac, reconnect terminals of the first, second, and third selected line voltage jumpers 102, 104, 106 are connected to the second end terminal of the first, third, and second phase windings 122, 130, 116, respectively. Similarly, when the three phase line voltage is to be connected to a nominal voltage level of 230 Vac, reconnect terminals of the first, second, and third selected line voltage jumpers 102, 104, 106 are connected to the first tap terminal of the first, third, and second phase windings 122, 130, 116, respectively.

Likewise, when the three phase line voltage is to be connected to a nominal voltage level of 460 Vac, reconnect terminals of the first, second, and third selected line voltage jumpers 102, 104, 106 are connected to the second tap terminal of the first, third, and second phase windings 122, 130, 116, respectively.

The first, second, and third transformers 110, 112, 114, for example, may be iron core transformers with three secondary windings as shown. Alternatively, the transformers may be another type and/or may have more or less windings depending on the nominal voltage levels desired or required by the associated load device.12 (FIG. 1).

In the embodiment being described, the high voltage secondary windings 118, 124, 132 (in combination with the first, second, and third high voltage relay contacts 142, 144, 146) develop a high voltage three phase, load voltage at R1, R2, R3. The nominal voltage level of the high voltage three phase load voltage at R1, R2, R3 is based on the three phase line voltage at L1, L2, L3 and the connections of the first, second, and third selected line voltage jumpers 102, 104, 106, as well as the ratio of the first, second, and third primary-windings 116, 122, 130 to the first, second, and third high voltage secondary windings 118, 124, 132. The high voltage three phase load voltage at R1, R2, R3 may, for example, have a nominal voltage level of 212 Vac or some other nominal voltage level. The high voltage three phase load voltage at R1, R2, R3 may, for example, be provided to the line filter 18 (FIG. 1).

Each of the high voltage secondary winding 118, 124, 132 include first and second end terminals. Similarly, each of the high voltage secondary relay contacts 142, 144, 146 include first and second terminals. Each leg of the delta configuration for the first, second, and third high voltage secondary windings 118, 124, 132 includes a high voltage secondary winding and a corresponding high voltage secondary relay contact. As shown, the second terminal of the first high voltage secondary relay contact 142 is connected to the first end terminal of the first high voltage secondary winding 118 and the second end terminal of the first high voltage secondary winding 118 is connected to the first terminal of the third high voltage secondary relay contact 146. Similarly, the second terminal of the third high voltage secondary relay contact 146 is connected to the first end terminal of the third high voltage secondary winding 132 and the second end terminal of the third high voltage secondary coil 132 is connected to the first terminal of the second high voltage secondary relay contact 144. Likewise, the second terminal of the second high voltage secondary relay contact 144 is connected to the first end terminal of the second high voltage secondary winding 124 and the second end terminal of the second high voltage secondary coil 124 is connected to the first terminal of the first high voltage secondary relay contact 142. The three junctions formed by the first terminal of the high voltage secondary-relay contact and the second end terminal of the preceding high voltage secondary winding establish the high voltage three phase load voltage at R1, R2, R3.

In the embodiment being described, the low voltage secondary windings 120, 126, 134 develop a low voltage three phase load voltage at S1, S2, S3. The nominal voltage level of the low voltage three phase load voltage at S1, S2, S3 is based on the three phase line voltage at L1, L2, L3 and the connections of the first, second, and third selected line voltage jumpers 102, 104, 106, as well as the ratio of the first, second, and third primary windings 116, 122, 130 to the first, second, and third low voltage secondary windings 120, 126, 134. The low voltage three phase load voltage at S1, S2, S3 may, for example, have a nominal voltage level of 20 Vac or some other nominal voltage level. As shown, the low voltage three phase load voltage at S1, S2, S3 is provided to the full wave rectifier 20. The full wave rectifier 20, for example, may include a 24 Vdc power supply that provides approximately 4% ripple for three phase rectification. The full wave rectifier 20 converts the low-voltage three phase load voltage at S1, S2, S3 to a dc load voltage. The dc load voltage may, for example, have a nominal voltage level of 24 Vdc or some other nominal voltage level. The dc load voltage is supplied to the over/under voltage protection circuit 22 through the PTC device 21. The PTC device 21 and over/under voltage protection circuit 22 operate as described above for FIG. 1. The dc load voltage from the over/under voltage protection circuit 22 may, for example, be provided to the robotic welding cell control device 24 (FIG. 1).

Each of the auxiliary single phase secondary winding 128, 136 include first and second end terminals. Similarly, the second master relay contact 140 includes first and second terminals. As shown, the second terminal of the first auxiliary single phase secondary winding 128 is connected to the second end terminal of the second auxiliary single phase secondary winding 136 and the first end terminal of the second auxiliary single phase secondary winding 136 is connected to the first terminal of the second master relay contact 140. The second end terminal of the first single phase secondary coil 128 and the second terminal of the second master relay contact 140 through optional circuit breaker CB1 25 establish the auxiliary single phase load voltage at A1, A2.

In the embodiment being described, the auxiliary single phase secondary windings 128, 136 develop an auxiliary single phase load voltage at A1, A2. The nominal voltage level of the auxiliary single phase load voltage at A1, A2 is based on the three phase line voltage L1, L2, L3 and the current connections of the selected line voltage jumpers 102, 104, 106, as well as the ratio of the second and third primary windings 122, 130 to the first and second auxiliary single phase secondary windings 128, 136, respectively. The auxiliary single phase load voltage at A1, A2 may, for example, have a nominal voltage level of 110 Vac or some other nominal voltage level in three phase operation. The auxiliary single phase load voltage at A1, A2 may, for example, be provided to the auxiliary power outlet 26 (FIG. 1) through circuit breaker CB1 25.

Figure 5:
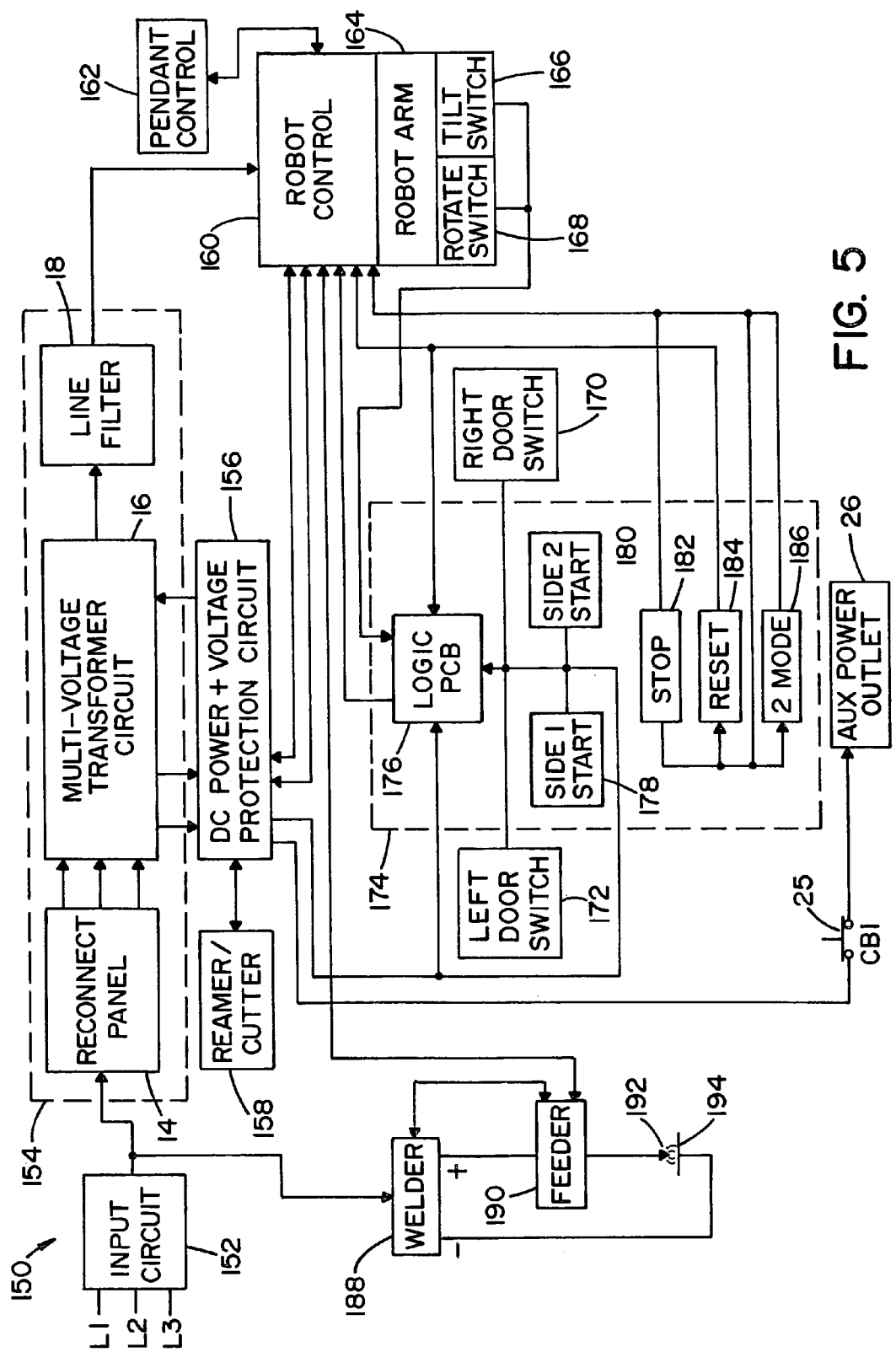
FIG. 5 is a block diagram of an exemplary robotic welding cell unit with an embodiment of a power reconnect and voltage protection device.

With reference to FIG. 5, an exemplary robotic welding cell unit 150 includes the circuit breaker CB1 25, auxiliary power outlet 26, an input circuit 152, an embodiment of a reconnect transformer circuit 154, and an embodiment of a dc power and voltage protection circuit 156. The reconnect transformer circuit 154 includes the reconnect panel 14, multi-voltage transformer circuit 16, and line filter 18 of FIG. 1. The reconnect panel 14, multi-voltage transformer circuit 16, and line filter 18 operate as described above in reference to FIG. 1. The dc power and voltage protection circuit 156 includes the full wave rectifier 20, PTC device 21, and over/under voltage protection circuit 22 of FIG. 1. The full wave rectifier 20, PTC device 21, and over/under voltage protection circuit-22 operate as described above in reference to FIG. 1.

The exemplary robotic welding cell unit 150 also includes a reamer/cutter 158, a robot control 160, a pendant control 162, a robot arm 164, a tilt switch 166, a rotate switch 168, a right door switch 170, a left door switch 172, and a control panel box 174. The control panel box 174 includes a logic PCB 176, a side 1 cycle-start 178 a side 2 cycle start 180, an emergency stop switch 182, a reset switch 184, and a two-mode switch 186. The exemplary robotic welding cell unit 150 further includes a welder 188, a feeder 190, a torch 192, and a work piece 194.

In the exemplary robotic welding cell unit 150, the input circuit 152 receives three phase line voltage at L1, L2, L3 from, for example, a utility power source or a local generator. The input circuit 152 may include a disconnect switch, a first set of fuses for the welder 188 and associated components, and a second set of fuses for the robot arm 164 and associated components. Switched/fused line voltage is distributed from the input circuit 152 to the welder 188 and associated components. Switched/fused line voltage is also distributed to the robot arm 164 and associated components via the reconnect transformer circuit 154. As discussed above, the multi-voltage transformer circuit 16 develops the high voltage load voltage, low voltage load voltage, and auxiliary single phase load voltage.

The input circuit 152 may alternatively receive single phase line voltage (e.g., L1, L2) and distribute switched/fused single phase line voltage to robot arm 164 (which can operate on single phase input) and associated components via the reconnect transformer circuit 154. Like the power reconnect and voltage protection device (FIG. 1), in single phase operation, the reconnect transformer circuit 154 and dc power and voltage protection circuit 156 provide a high voltage single phase load voltage (e.g., 212 Vac), an auxiliary single phase load voltage (e.g., 126 Vac), and a dc load voltage (e.g., 20 Vdc) to the robot arm 164 and associated components. For single phase operation, jumpers or discreet wiring in the reconnect panel 14 is configured differently than in three phase operation and additional filtering (e.g., additional capacitance) may be connected across the dc load voltage in either the full wave rectifier 20 (FIG. 1) or the over/under voltage protection circuit 22 (FIG. 1).

Note that the same reconnect transformer circuit 154 and dc power and voltage protection circuit 156 may be used to connect a three phase robotic welding cell unit and auxiliary loads to multiple three phase input voltage levels and a single phase robotic welding cell unit and auxiliary loads to multiple single phase input voltage levels.

The low voltage supply voltage is distributed from the multi-voltage transformer circuit 16 to the dc power and voltage protection circuit 156. Within the dc over/under voltage protection circuit, the full wave rectifier 20 (FIG. 1) receives the low voltage load voltage and develops the dc load voltage. The dc load voltage is distributed by the full wave rectifier 20 (FIG. 1) to the over/under voltage protection circuit 22 (FIG. 1). The over/under voltage protection circuit 22 (FIG. 1) senses the voltage level of the dc load voltage and, when the voltage level is within a predetermined range (e.g., greater than a first predetermined threshold (e.g., about 16 Vdc) and less than a second predetermined threshold (e.g., about 30 Vdc)), for a predetermined sense time, distributes the dc load voltage to the robot arm 164 and associated components. Note that when the voltage level of the dc load voltage is outside the predetermined range (e.g., less than a first predetermined threshold (e.g., about 16 Vdc) or greater than a second predetermined threshold (e.g., about 30 Vdc)) to actuate the master relay 30 (FIG. 2) of the over/under voltage protection circuit 22 (FIG. 1) this effectively disables distribution of the dc load voltage, high voltage load voltage, and auxiliary single phase load voltage.

When the dc load voltage is within the predetermined range for the predetermined time, the high voltage load voltage is distributed from the multi-voltage transformer circuit 16 to the robot arm 164 and associated components via the line filter 18.

The auxiliary single phase load voltage is distributed from the from the multi-voltage transformer circuit 16 to a second main relay contact 140 (FIG. 4) in the dc power and voltage protection circuit 156. When the dc load voltage is within predetermined range for the predetermined time, the over/under voltage protection circuit 22 (FIG. 1) energizes the master relay 36 (FIG. 2) and the second main relay contact 140 (FIG. 4) is closed, thereby providing the auxiliary single phase load voltage to the auxiliary power outlet 26 via the dc power and voltage protection circuit 156.

The control 162 and associated components control the position of the robot arm 164 holding torch (i.e., welding electrode) 192 as well as operation of the reamer/cutter 158, welder 188, and feeder 190.

Figure 6:
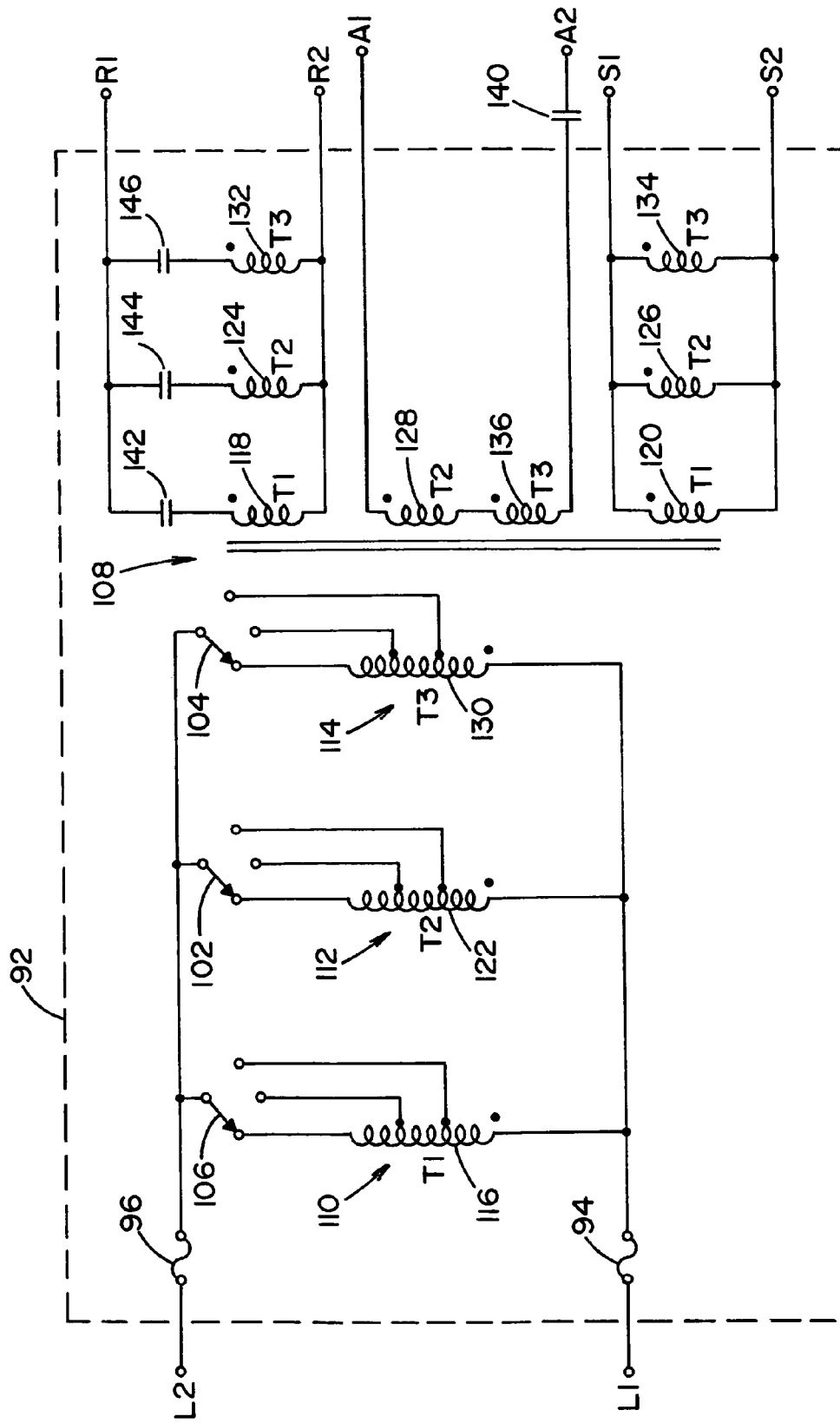
FIG. 6 is a schematic diagram of an embodiment of a reconnect transformer circuit configured for single phase operation.

With reference to FIG. 6, an embodiment of the reconnect transformer circuit 92 is configured for single phase operation. As shown, the first, second, and third primary windings 116, 122, 130 are connected in parallel, the first, second, and third high voltage secondary windings 118, 124, 132 (in combination with the first, second, and third high voltage relay contacts 142, 144, 146) are connected in parallel, the first, second, and third low voltage secondary windings 120, 126, 134 are connected in parallel, and the first and second auxiliary single phase secondary windings 128, 136 are connected in series. The transformer windings and associated components are reconnected for single-phase operation in this manner from three phase operation by changing jumpers and/or discreet wiring connections and vice versa. This permits the power reconnect and voltage protection device 90 (FIG. 1) to be connected for three phase operation and subsequently reconnected for single phase operation to supply power to a single phase load device and vice versa.

The reconnect transformer circuit 92 receives single phase line voltage L1, L2 at the first and second fuses 94, 96, respectively. The fused single phase line voltage is provided to the first, second, and third primary windings 116, 122, 130 via the first, second, and third selected line voltage jumpers 106, 102, 104, respectively. The first, second, and third selected line voltage jumpers 106, 102, 104 may be either jumper or discrete wiring connections that are reconnected in different configurations to correspond to different single phase line voltage levels (e.g., 230 Vac, 460 Vac, and 575 Vac). In the embodiment being described, the selected line voltage jumpers 106, 102, 104, are connected and operate in the same manner as described above for three phase operation.

In the embodiment being described, the high voltage secondary windings 118, 124, 132 (in combination with the first, second, and third high voltage relay contacts 142, 144, 146) develop a high voltage single phase load voltage at R1, R2. The nominal voltage level of the high voltage three phase load voltage at R1, R2, R3 is based on the single phase, line voltage at L1, L2 and the current connections of the first, second, and third selected line voltage jumpers 106, 102, 104, as well as the ratio of the first, second, and third primary windings 116, 122, 130 to the first, second, and third high-voltage secondary windings 118, 124, 132. The high voltage single phase load voltage at R1, R2 may, for example, have a nominal voltage level of 212 Vac or some other nominal voltage level. The high voltage single phase load voltage at R1, R2 may, for example, be provided to the line filter 18 (FIG. 1).

In the embodiment being described, the low voltage secondary windings 120, 126, 134 develop a low voltage single phase load voltage at S1, S2. The nominal voltage level of the low voltage single phase load voltage at S1, S2 is based on the single phase line voltage at L1, L2 and the current connections of the first, second, and third selected line voltage jumpers 106, 102, 104, as well as the ratio of the first, second, and third primary windings 116, 122, 130 to the first, second, and third low voltage secondary windings 120, 126, 134. The low voltage single phase load voltage at S1, S2, S3 may, for example, have a nominal voltage level of 20 Vac or some other nominal voltage level. The low voltage single phase load voltage at S1, S2, S3 may, for example, be provided to the full wave rectifier 20 (FIG. 4).

In the embodiment being described, the auxiliary single phase secondary windings 128, 136 develop an auxiliary single phase load voltage at A1, A2. The nominal voltage level of the auxiliary single phase load voltage at A1, A2 is based on the single phase line voltage at L1, L2 and the current connections of the second and third selected line voltage jumpers 102, 104, as well as the ratio of the second and third primary windings 122, 130 to the first and second auxiliary single phase secondary windings 128, 136, respectively. The auxiliary single phase load voltage at A1, A2 may, for example, have a nominal voltage level of 127 Vac or some other nominal voltage level in single phase operation. The auxiliary single phase load voltage at A1, A2 may, for example, be provided to the auxiliary power outlet 26 (FIG. 1) through circuit breaker CB1 27 (FIG. 1).

Figure 7A:
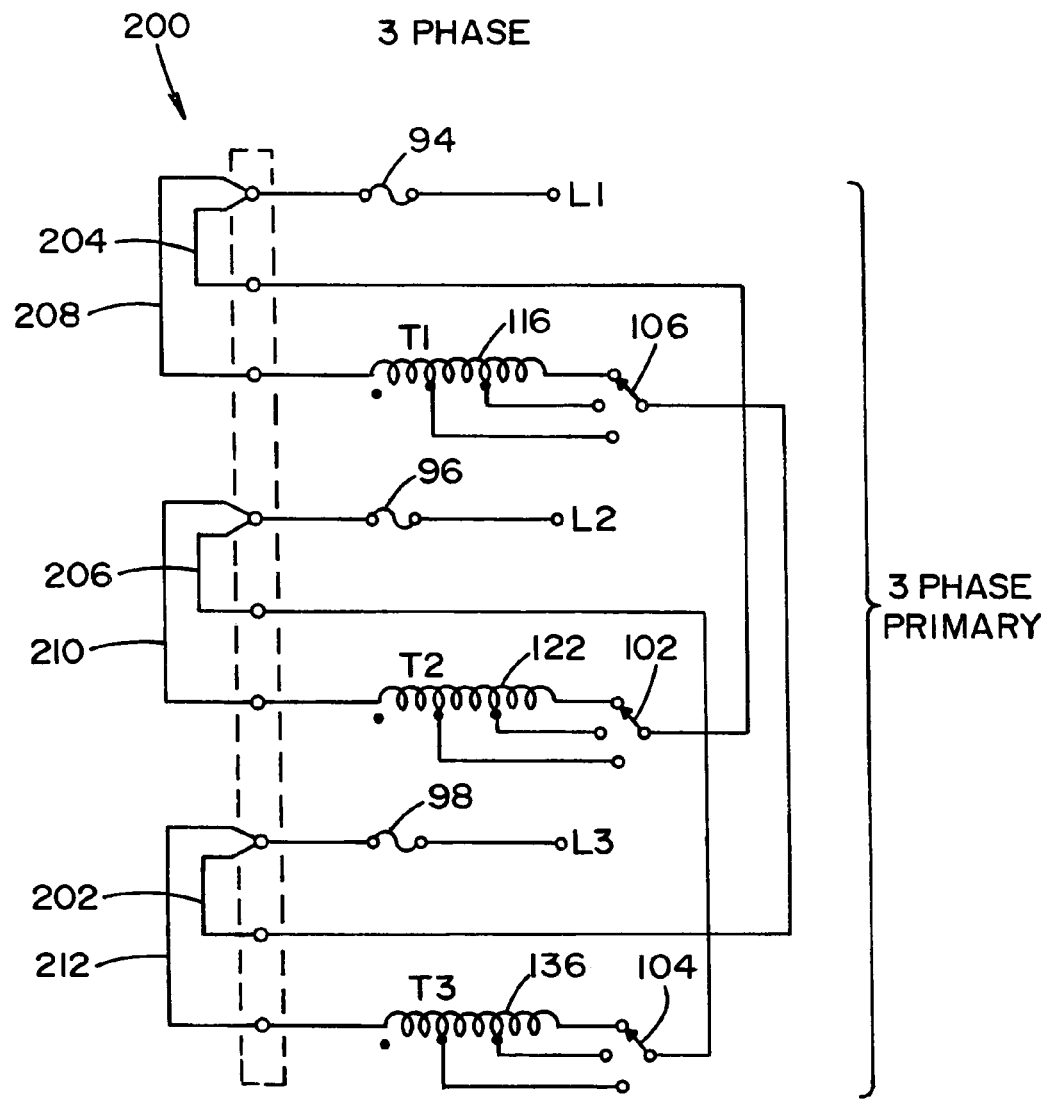
FIG. 7 is a wiring diagram of an embodiment of a reconnect transformer circuit with jumpers connected for three phase operation.
Figure 7B:
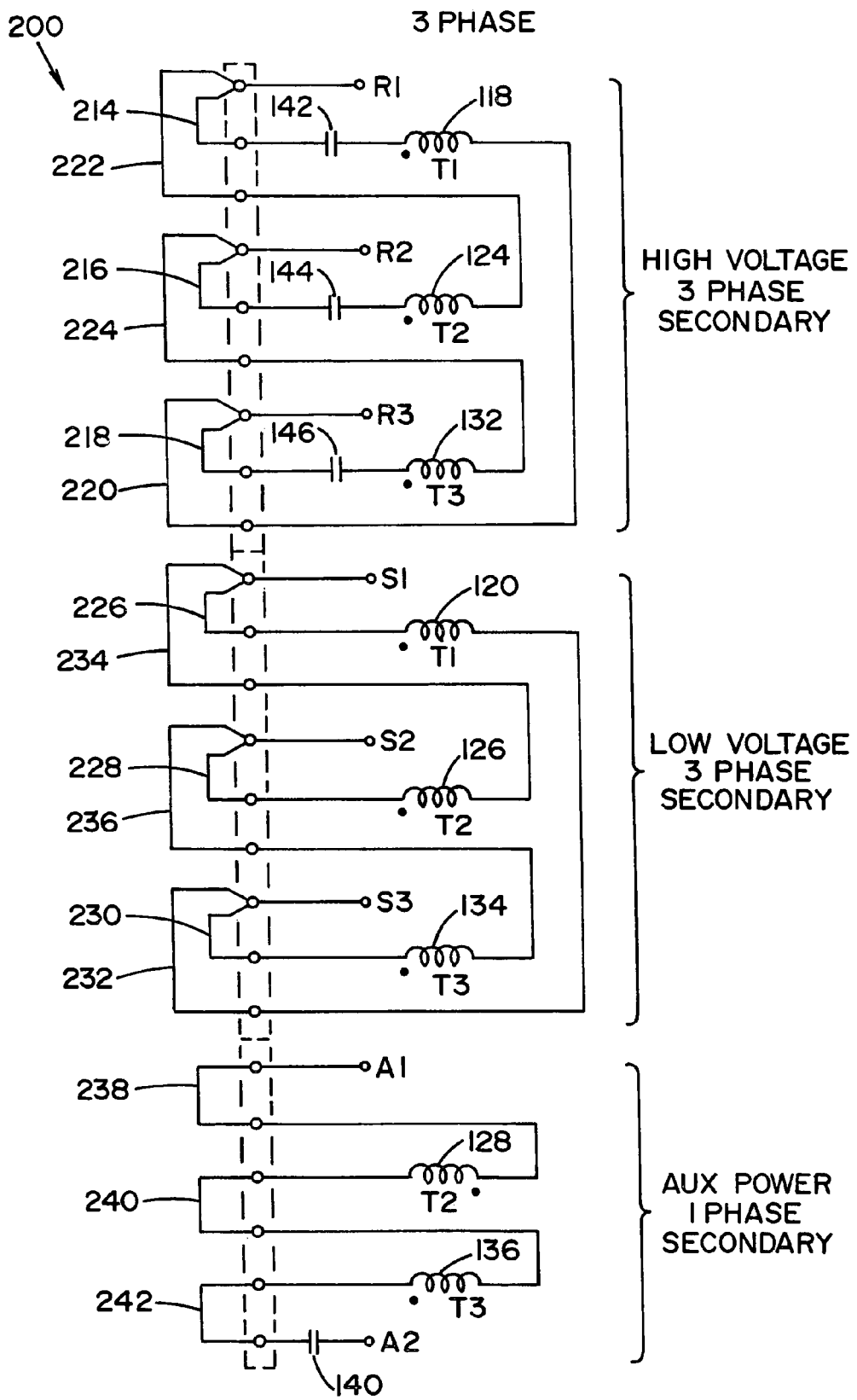

With reference to FIG. 7, a three phase wiring diagram 200 of an embodiment of the reconnect transformer circuit 92 (FIG. 4) includes the first, second, and third fuses 94, 96, 98, first, second, and third selected line voltage jumpers 106, 102, 104, first, second, and third primary windings 116, 122, 136, first, second, and third high voltage secondary windings 118, 124, 132, first, second, and third low voltage secondary windings 120, 126, 134, first and second auxiliary single phase secondary windings 128, 136, second master relay contact 140, and first, second, and third high voltage secondary relay contacts 142, 144, 146. These components are connected for three phase operation by first, second, and third fused line voltage jumpers 202, 204, 206, first, second, and third primary jumpers 208, 210, 212, first, second, and third high voltage relay contact jumpers 214, 216, 218, first, second, and third high voltage secondary-jumpers 220, 222, 224, first, second, and third low voltage secondary first end jumpers 226, 228, 230, first, second, and third low voltage secondary second end jumpers 232, 234, 236, and first, second, and third auxiliary secondary jumpers 238, 240, 242.

The third fused line voltage jumper 202 connects the third fuse 98 to the third selected line voltage jumper 106. The first fused line voltage jumper 204 connects the first fuse 94 to the second selected line voltage jumper 102. The second fused line voltage jumper 206 connects the second fuse 96 to the third selected line voltage jumper 104. The first primary jumper 208 connects the first fuse 94 to the first end of the first primary winding 116. The second primary jumper 210 connects the second fuse 96 to the first end of the second primary winding 122. The third primary jumper 212 connects the third fuse 98 to the first end of the third primary winding 136.

The first high voltage relay contact jumper 214 connects R1 to the first high voltage relay contact 142. The second high voltage relay contact jumper 216 connects R2 to the second high voltage relay contact 144. The third high voltage relay contact jumper 218 connects R3 to the third high voltage relay contact 146. The first high voltage secondary jumper 220 connects R3 to the first high voltage secondary winding 118. The second high voltage secondary jumper 222 connects R1 to the second high voltage secondary winding 124. The third high voltage secondary jumper 224 connects R2 to the third high voltage secondary winding 132.

The first low voltage secondary first end jumper 226 connects S1 to the first end of the first low voltage secondary winding 120. The second low voltage secondary first end jumper 228 connects S2 to the first end of the second low voltage secondary winding 126. The third low voltage secondary first end jumper 230 connects S3 to the first end of the third low voltage secondary winding 134. The first low voltage secondary second end jumper 232 connects S3 to the second end of the first low voltage secondary winding 120. The second low voltage secondary second end jumper 234 connects S1 to the second end of the second low voltage secondary winding 126. The third low voltage secondary second end jumper 236 connects S2 to the second end of the third low voltage secondary winding 134.

The first auxiliary secondary jumper 238 connects A1 to the first end of the first auxiliary single phase secondary winding 128. The second auxiliary secondary jumper 240 connects the second end of the first auxiliary single phase secondary winding 128 to the second end of the second auxiliary single phase secondary winding 136. The third auxiliary secondary jumper 242 connects the first end of the second auxiliary single phase secondary winding 136 to the second master relay contact 140.

The jumpers and components shown may be interconnected via one or more terminal strips (or switches) in the reconnect panel 14 (FIG. 1). Alternatively, the jumper configuration shown may be implemented by discreet point-to-point wiring connecting the components. Combinations of jumpers, switches and discreet wiring that provide the connections for three phase operation shown may also be implemented.

As discussed above, for three phase operation, the first, second, and third primary windings 116, 122, 130 are connected in a delta configuration, the first, second, and third high voltage secondary windings 118, 124, 132 (in combination with the first, second, and third high voltage relay contacts 142, 144, 146) are connected in a delta configuration, the first, second, and third low voltage secondary windings 120, 126, 134 are connected in a delta configuration, and the first and second auxiliary single phase secondary windings 128, 136 are connected in an open wye configuration.

Figure 8A:
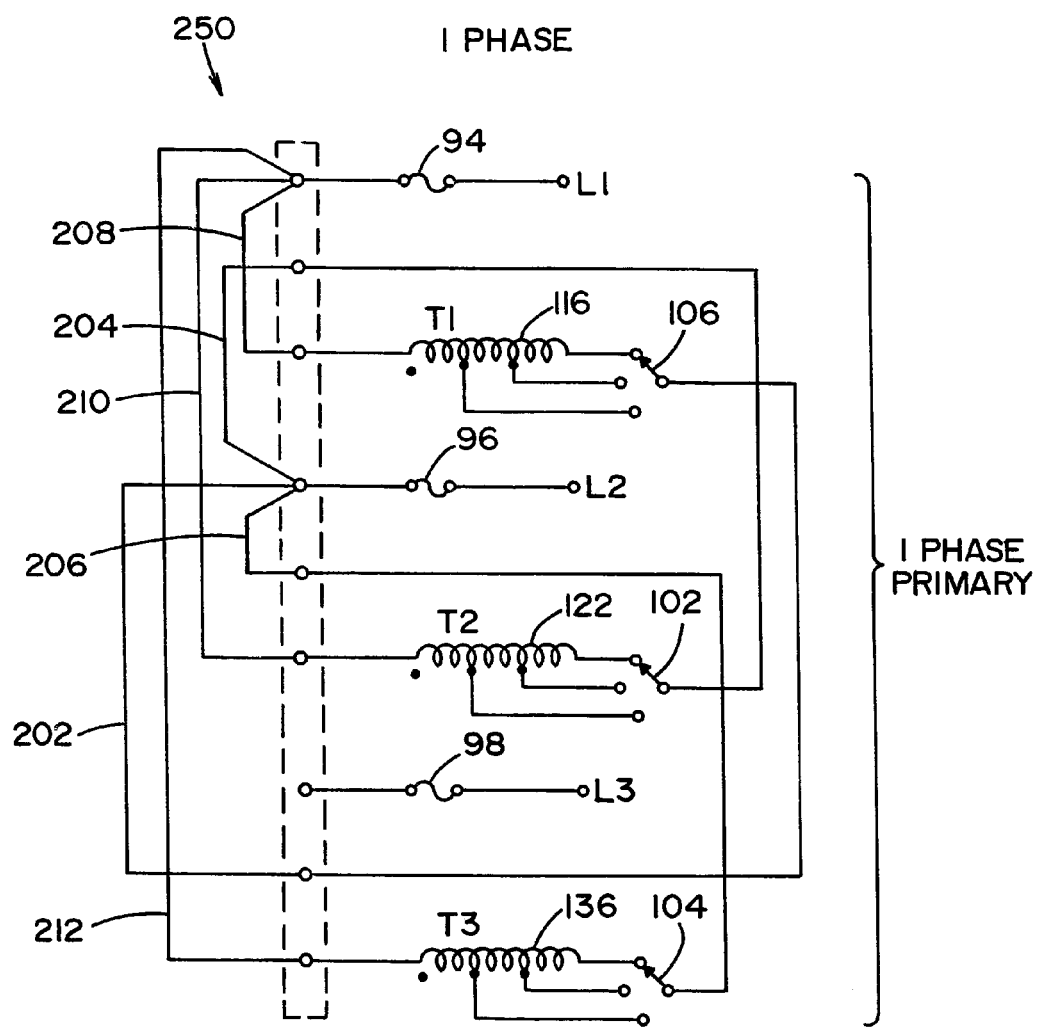
FIG. 8 is a wiring diagram of an embodiment of a reconnect transformer circuit with jumpers connected for single phase operation.
Figure 8B:
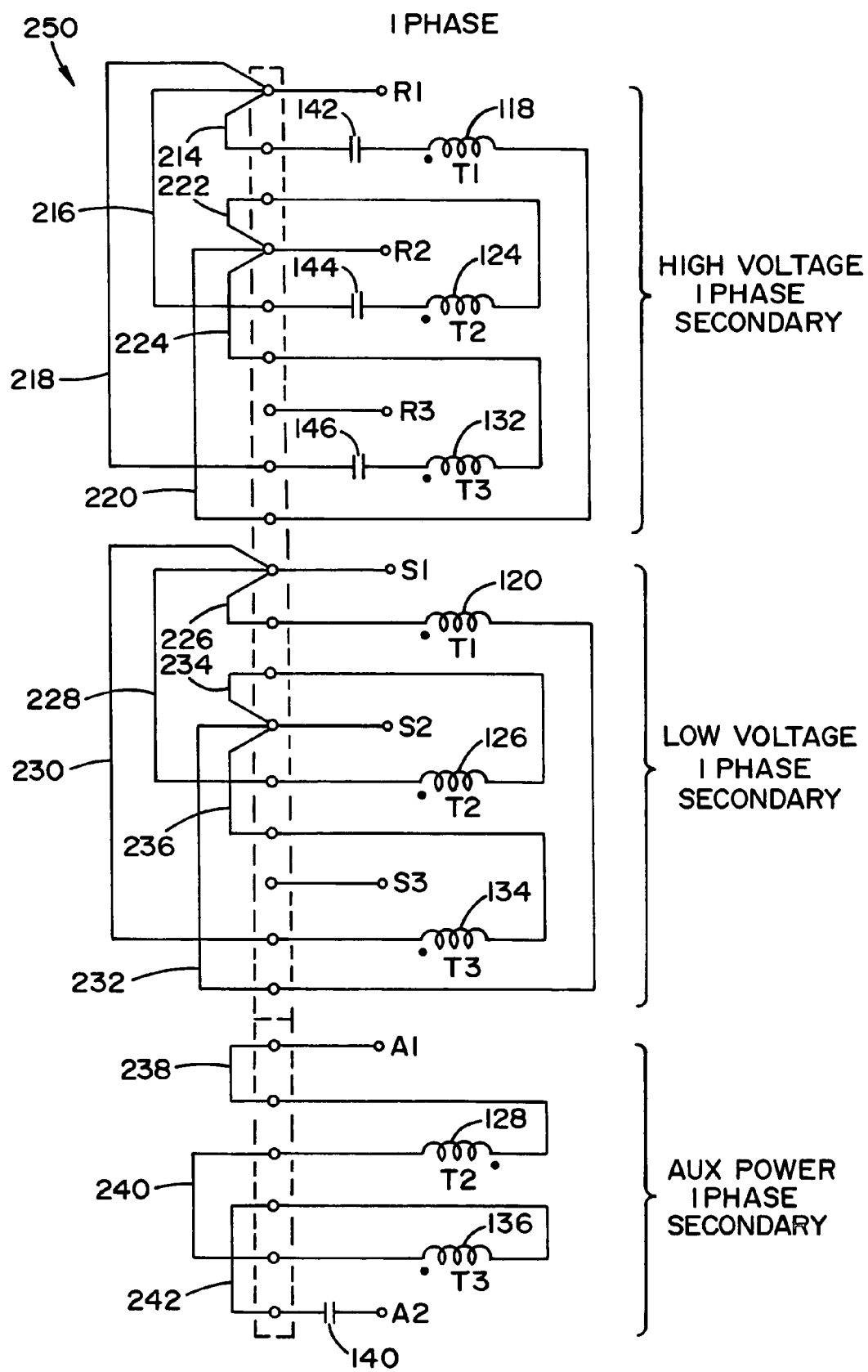

With reference to FIG. 8, a single phase wiring diagram 250 of an embodiment of the reconnect transformer circuit 92 (FIG. 4) includes the same components and jumpers identified in FIG. 7 reconnected (i.e., reconfigured) for single phase operation. It is presumed that the single phase line voltage is provided by L1 and L2.

In single phase operation: i) the first fused line voltage jumper 202 connects the second fuse 96 to the third selected line voltage jumper 106, ii) the second fused line voltage jumper 204 connects the second fuse 96 to the first selected line voltage jumper 102, and iii) the third fused line voltage jumper 206 connects the second fuse 96 to the second selected line voltage jumper 104. Note that the first and second fused line voltage jumpers 202, 204 are connected differently in single and three phase operation and the third fused line voltage jumper 206 is connected the same in single and three phase operation.

In single phase operation: i) the first primary jumper 208 connects the. first fuse 94 to the first end of the first primary winding 116, ii) the second primary jumper 210 connects the first fuse 94 to the first end of the second primary winding 122, and iii) the third primary jumper 212 connects the first fuse 94 to the first end of the third primary winding 136. Note that the second and third primary jumpers 210, 212 are connected differently in single and three phase operation and the first primary jumper 208 is connected the same in single and three phase operation.

In single phase operation: i) the first high voltage relay contact jumper 214 connects R1 to the first high voltage relay contact 142, ii) the second high voltage relay contact jumper 216 connects R1 to the second high voltage relay contact 144, and iii) the third high voltage relay contact jumper 218 connects R1 to the third high voltage relay contact 146. Note that the second and third high voltage relay contact jumpers 216, 218 are connected differently in single and three phase operation and the first high voltage relay contact jumper 214 is connected the same in single and three phase operation.

In single phase operation: i) the first high voltage secondary jumper 220 connects R2 to the first high voltage secondary winding 118, ii) the second high voltage secondary jumper 222 connects R2 to the second high voltage secondary winding 124, and iii) the third high voltage secondary jumper 224 connects R2 to the third high voltage secondary winding 132. Note that the first and second high voltage secondary jumpers 220, 222 are connected differently in single and three phase operation and the third high voltage secondary jumper 224 is connected the same in single and three phase operation.

In single phase operation: i) the first low voltage secondary first end jumper 226 connects S1 to the first end of the first low voltage secondary winding 120. The second low voltage secondary first end jumper 228 connects S1 to the first end of the second low voltage secondary winding 126. The third low voltage secondary first end jumper 230 connects S1 to the first end of the third low voltage secondary winding 134. Note that the second and third low voltage secondary first end jumpers 228, 230 are connected differently in single and three phase operation and the first low voltage secondary first end jumper 226 is connected the same in single and three phase operation.

In single phase operation: i) the first low voltage secondary second end jumper 232 connects S2 to the second end of the first low voltage secondary winding 120, ii) the second low voltage secondary second end jumper 234 connects S2 to the second end of the second low voltage secondary winding 126, and iii) the third low voltage secondary second end jumper 236 connects S2 to the second end of the third low voltage secondary winding 134. Note that the first and second low voltage secondary second end jumpers 232, 234 are connected differently in single and three phase operation and the third low voltage secondary second end jumper 236 is connected the same in single and three phase operation.

In single phase operation: i) the first auxiliary secondary jumper 238 connects A1 to the first end of the first auxiliary single phase secondary winding 128, ii) the second auxiliary secondary jumper 240 connects the second end of the first auxiliary single phase secondary winding 128 to the first end of the second auxiliary single phase secondary winding 136, and iii) the third auxiliary secondary jumper 242 connects the second end of the second auxiliary single phase secondary winding 136 to the second master relay contact 140. Note that the second and third auxiliary secondary jumpers 240, 242 are connected differently in single and three phase operation and the first auxiliary secondary jumper 238 is connected the same in single and three phase operation.

Like three phase operation, the jumpers and components shown may be interconnected via one or more terminal strips (or switches) in the reconnect panel 14 (FIG. 1). Alternatively, the jumper configuration shown may be implemented by discreet point-to-point wiring connecting the components. Combinations of jumpers, switches and discreet wiring that provide the connections for single phase operation shown may also be implemented.

As discussed above, for single phase operation, the first, second, and third primary windings 116, 122, 130 are connected in parallel, the first, second, and third high voltage secondary windings 118, 124, 132 (in combination with the first, second, and third high voltage relay contacts 142, 144, 146) are connected in parallel, the first, second, and third low voltage secondary windings 120, 126, 134 are connected in parallel, and the first and second auxiliary single phase secondary windings 128, 136 are connected in series.

The exemplary embodiments are described with reference to preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A power connect device adapted to receive ac line voltage and provide ac load voltage to a load device, including:
    a connect panel adapted to receive at least two of first, second, and third input power conductors that provide the ac line voltage to the connect panel, the ac line voltage having a first nominal line voltage level or a second nominal line voltage level depending on a source of the ac line voltage;
    a transformer circuit in communication with the connect panel and adapted to produce a first ac load voltage at a first nominal load voltage level, the transformer circuit including:
        a first transformer with a first primary winding, a first high voltage secondary winding, and a first low voltage secondary winding;
        a second transformer with a second primary winding, a second high voltage secondary winding, and a second low voltage secondary winding; and
        a third transformer with a third primary winding, a third high voltage secondary winding, and a third low voltage secondary winding;
        wherein the first, second, and third primary windings are adapted to receive the ac line voltage, wherein the first, second, and third high voltage secondary windings are adapted to produce the first ac load voltage, wherein the first, second, and third low voltage secondary windings are adapted to produce a second ac load voltage at a second nominal load voltage level, wherein the second nominal load voltage level is less than the first nominal load voltage level;
    a high voltage relay with first, second, and third high voltage relay contacts, wherein the first, second, and third high voltage relay contacts are normally open, wherein the first high voltage relay contact is in communication with the first high voltage secondary winding and adapted to open and close a first high voltage load circuit providing the first ac load voltage from the first high voltage secondary winding to the load device, wherein the second high voltage relay contact is in communication with the second high voltage secondary winding and adapted to open and close a second high voltage load circuit providing the first ac load voltage from the second high voltage secondary winding to the load device, wherein the third high voltage relay contact is in communication with the third high voltage secondary winding and adapted to open and close a third high voltage load circuit providing the first ac load voltage from the third high voltage secondary winding to the load device;
    a rectifier in communication with the transformer circuit and adapted to receive the second ac load voltage and produce a dc load voltage at a nominal dc voltage level; and
    a voltage protection circuit in communication with the rectifier and the high voltage relay, wherein the voltage protection circuit is adapted to receive the dc load voltage from the rectifier, wherein the voltage protection circuit determines if a present nominal dc voltage level for the dc load voltage is within a predetermined range and disables the high voltage relay until the voltage protection circuit determines the present nominal dc voltage level is within the predetermined range for a predetermined time.

2. The power connect device set forth in claim 1 wherein the ac line voltage is three phase and first, second, and third primary windings are connected to the first, second, and third input power conductors in a delta configuration, wherein the first, second, and third high voltage secondary windings are connected in a delta configuration and the first ac load voltage is three phase, wherein the first, second, and third low voltage secondary windings are connected in a delta configuration and the second ac load voltage is three phase.

3. The power connect device set forth in claim 2 wherein the ac line voltage is single three phase and first, second, and third primary windings are reconnected to the first and third input power conductors in a parallel configuration, wherein the first, second, and third high voltage secondary windings are reconnected in a parallel configuration and the first ac load voltage is single phase, wherein the first, second, and third low voltage secondary windings are reconnected in a parallel configuration and the second ac load voltage is single phase.

4. The power connect device set forth in claim 2, each primary winding including:
    first and second end terminals disposed at opposing ends of the corresponding primary winding; and
    a first tap terminal disposed between the first and second end terminals;
    the connect panel including:
    a first input power connection connecting the first input power conductor to the first end terminal of the first primary winding and one of the second end terminal and the first tap terminal of the second primary winding;
    a second input power connection connecting the second input power conductor to the first end terminal of the second primary winding and one of the second end terminal and the first tap terminal of the third primary winding; and
    a third input power connection connecting the third input power conductor to the first end terminal of the third primary winding and one of the second end terminal and the first tap terminal of the first primary winding.

5. The power connect device set forth in claim 4 wherein the first nominal line voltage level is less than the second nominal line voltage level, wherein, if the ac line voltage is at the first nominal line voltage level, the first input power connection is connecting the first input power conductor to the first tap terminal of the second primary winding, the second input power connection is connecting the second input power conductor to the first tap terminal of the third primary winding, and the third input power connection is connecting the third input power conductor to the first tap terminal of the first primary winding, then the first nominal load voltage level is compatible with a first voltage rating associated with the load device.

6. The power connect device set forth in claim 4 wherein the first nominal line voltage level is less than the second nominal line voltage level, wherein, if the ac line voltage is at the second nominal line voltage level, the first input power connection is connecting the first input power conductor to the second end terminal of the second primary winding, the second input power connection is connecting the second input power conductor to the second end terminal of the third primary winding, and the third input power connection is connecting the third input power conductor to the second end terminal of the first primary winding, then the first nominal load voltage level is compatible with a first voltage rating associated with the load device.

7. The power connect device set forth in claim 4 wherein the first nominal line voltage level is less than the second nominal line voltage level, wherein, if the ac line voltage is at the second nominal line voltage level, the first input power connection is connecting the first input power conductor to the first tap terminal of the second primary winding, the second input power connection is connecting the second input power conductor to the first tap terminal of the third primary winding, and the third input power connection is connecting the third input power conductor to the first tap terminal of the first primary winding, then the first nominal load voltage level is not compatible with a first voltage rating associated with the load device.

8. The power connect device set forth in claim 4 wherein the first nominal line voltage level is less than the second nominal line voltage level, wherein, if the ac line voltage is at the second nominal line voltage level, the first input power connection is connecting the first input power conductor to the first tap terminal of the second primary winding, the second input power connection is connecting the second input power conductor to the first tap terminal of the third primary winding, and the third input power connection is connecting the third input power conductor to the first tap-terminal of the first primary winding, then the voltage protection circuit determines that the present nominal dc voltage level for the dc load voltage exceeds a predetermined threshold associated with an upper end of the predetermined range and disables the high voltage relay.

9. The power connect device set forth in claim 4 wherein the first nominal line voltage level is less than the second nominal line voltage level, wherein, if the ac line voltage is at the first nominal line voltage level, the first input power connection is connecting the first input power conductor to the second end terminal of the second primary winding, the second input power connection is connecting the second input power conductor to the second end terminal of the third primary winding, and the third input power connection is connecting the third input power conductor to the second end terminal of the first primary winding, then the voltage protection circuit determines that the present nominal dc voltage level for the dc load voltage is less than a predetermined threshold associated with a lower end of the predetermined range and disables the high voltage relay.

10. The power connect device set forth in claim 1 wherein the ac line voltage is single phase and first, second, and third primary windings are connected to the first, and second input power conductors in a parallel configuration, wherein the first, second, and third high voltage secondary windings are connected in a parallel configuration and the first ac load voltage is single phase, wherein the first, second, and third low voltage secondary windings are connected in a parallel configuration and the second ac load voltage is single phase.

11. The power connect device set forth in claim 10 wherein the ac line voltage is three phase and first, second, and third primary windings are reconnected to the first, second, and third input power conductors in a delta configuration, wherein the first, second, and third high voltage secondary windings are reconnected in a delta configuration and the first ac load voltage is three phase, wherein the first, second, and third low voltage secondary windings are reconnected in a delta configuration and the second ac load voltage is three phase.

12. The power connect device set forth in claim 10, each primary winding including:
　first and second end terminals disposed at opposing ends of the corresponding primary winding; and
　a first tap terminal disposed between the first and second end terminals;
　the connect panel including:
　a first input power connection connecting the first input power conductor to the first end terminal of the first primary winding, the first end terminal of the second primary winding, and the first end terminal of the third primary winding; and
　a second input power connection connecting the second input power conductor to one of the second end terminal and the first tap terminal of the first primary winding, one of the second end terminal and the first tap terminal of the second, primary winding, and one of the second end terminal and the first tap terminal of the third primary winding.

13. The power connect device set forth in claim 12 wherein the first nominal line voltage level is less than the second nominal line voltage level, wherein, if the ac line voltage is at the first nominal line voltage level and the second input power connection is connecting the second input power conductor to the first tap terminal of the first primary winding, the first tap terminal of the second primary winding, and the first tap terminal of the third primary winding, then the first nominal load voltage level is compatible with a first voltage rating associated with the load device.

14. The power connect device set forth in claim 12 wherein the first nominal line voltage level is less than the second nominal line voltage level, wherein, if the ac line voltage is at the second nominal line voltage level and the second input power connection is connecting the second input power conductor to the second end terminal of the first primary winding, the second end terminal of the second primary winding, and the second end terminal of the third primary winding, then the first nominal load voltage level is compatible with a first voltage rating associated with the load device.

15. The power connect device set forth in claim 12 wherein the first nominal line voltage level is less than the second nominal line voltage level, wherein, if the ac line voltage is at the second nominal line voltage level and the second input power, connection is connecting the second input power conductor to the first tap terminal of the first primary winding, the first tap terminal of the second primary winding, and the first tap terminal of the third primary winding, then the first nominal load voltage level is not compatible with a first voltage rating associated with the load device.

16. The power connect device set forth in claim 12 wherein the first nominal line voltage level is less than the second nominal line voltage level, wherein, if the ac line voltage is at the second nominal line voltage level and the second input power connection is connecting the second input power conductor to the first tap terminal of the first primary winding, the first tap terminal of the second primary winding, and the first tap terminal of the third primary winding, then the voltage protection circuit determines that the present nominal dc voltage level for the dc load voltage exceeds a predetermined threshold associated with an upper end of the predetermined range and disables the high voltage relay.

17. The power connect device set forth in claim 12 wherein the first nominal line voltage level is less than the second nominal line voltage level, wherein, if the ac line voltage is at the first nominal line voltage level and the second input power connection is connecting the second input power conductor to the second end terminal of the first primary winding, the second end terminal of the second primary winding, and the second end terminal of the third primary winding, then the voltage protection circuit determines that the present nominal dc voltage level for the dc load voltage is less than a predetermined threshold associated with a lower end of the predetermined range and disables the high voltage relay.

18. The power connect device set forth in claim 1 wherein a nominal frequency level for the ac line voltage, first ac load voltage, and second ac load voltage is nominally 50 Hz or nominally 60 Hz.

19. The power connect device set forth in claim 1 wherein the first nominal line voltage level is less than the second nominal line voltage level, wherein, if the ac line voltage is at the first nominal line voltage level, the first nominal load voltage level is compatible with a first voltage rating associated with the load device, wherein, if the ac line voltage is at the second nominal line voltage level, the first nominal load voltage level is not compatible with the first voltage rating associated with the load device, wherein, if the ac line voltage is at the second nominal line voltage level, the voltage protection circuit determines that the present nominal dc voltage level for the dc load voltage exceeds a predetermined threshold associated with an upper end of the predetermined range and disables the high voltage relay.

20. The power connect device set forth in claim 1 wherein the first nominal line voltage level is less than the second nominal line voltage level, wherein, if the ac line voltage is at the second nominal line voltage level, the first nominal load voltage level is compatible with a first voltage rating associated with the load device, wherein, if the ac line voltage is at the first nominal line voltage level, the first nominal load voltage level is not compatible with the first voltage rating associated with the load device, wherein, if the ac line voltage is at the first nominal line voltage level, the voltage protection circuit determines that the present nominal dc voltage level for the dc load voltage is less than a predetermined threshold associated with a lower end of the predetermined range and disables the high voltage relay.

21. The power connect device set forth in claim 1, the second transformer further including:
a first auxiliary secondary winding; and
the third transformer further including:
a second auxiliary secondary winding;

wherein the first and second auxiliary secondary windings are adapted to produce a third ac load voltage at a third nominal load voltage level;
the power connect device further including:
an auxiliary relay with a first auxiliary relay contact, wherein the first auxiliary relay contact is normally open, wherein the first auxiliary relay contact is in communication with the second auxiliary secondary winding and adapted to open and close a third ac load circuit providing the third ac load voltage from the first and second auxiliary secondary windings to the load device;
wherein, when the voltage protection circuit determines the present nominal dc voltage level for the dc load voltage is outside the predetermined range, the voltage protection circuit disables the auxiliary relay until the voltage protection circuit determines the present nominal dc voltage level is within the predetermined range for the predetermined time.

22. The power connect device set forth in claim 21 wherein the first nominal line voltage level is less than the second nominal line voltage level, wherein, if the ac line voltage is at the first nominal line voltage level, the first nominal load voltage level is compatible with a first voltage rating associated with the load device and the third nominal load voltage level is compatible with a second voltage rating associated with the load device, wherein, if the ac line voltage is at the second nominal line voltage level, the first nominal load voltage level is not compatible with the first voltage rating associated with the load device and the third nominal load voltage level is not compatible with the second voltage rating associated with the load device, wherein, if the ac line voltage is at the second nominal line voltage level, the voltage protection circuit determines that the present nominal dc voltage level for the dc load voltage exceeds a predetermined threshold associated with an upper end of the predetermined range and disables the high voltage and auxiliary relays.

23. The power connect device set forth in claim 21 wherein the first nominal line voltage level is less than the second nominal line voltage level, wherein, if the ac line voltage is at the second nominal line voltage level, the first nominal load voltage level is compatible with a first voltage rating associated with the load device and the third nominal load voltage level is compatible with a second voltage rating associated with the load device, wherein, if the ac line voltage is at the first nominal line voltage level, the first nominal load voltage level is not compatible with the first voltage rating associated with the load device and the third nominal load voltage level is not compatible with the second voltage rating associated with the load device, wherein, if the ac line voltage is at the first nominal line voltage level, the voltage protection circuit determines that the present nominal dc voltage level for the dc load voltage is less than a predetermined threshold associated with a lower end of the predetermined range and disables the high voltage and auxiliary relays.

24. The power connect device set forth in claim 21 wherein the ac line voltage is three phase and the first, second, and third primary windings are connected to the first, second, and third input power conductors in a delta configuration, wherein the first and second auxiliary secondary winding are connected in an open wye configuration and the third ac load voltage is single phase.

25. The power connect device set forth in claim 24 wherein the ac line voltage is single phase and the first, second, and third primary windings are reconnected to the first and second input power conductors in a parallel configuration, wherein the first and second auxiliary secondary winding are reconnected in a series configuration and the third ac load voltage is single phase.

26. The power connect device set forth in claim 21 wherein the ac line voltage is single phase and the first, second, and third primary windings are connected to the first and second input power conductors in a parallel configuration, wherein the first and second auxiliary secondary winding are connected in a series configuration and the third ac load voltage is single phase.

27. The power connect device set forth in claim 26 wherein the ac line voltage is three phase and the first, second, and third primary-windings are reconnected to the first, second, and third input power conductors in a delta configuration, wherein the first and second auxiliary secondary winding are reconnected in an open wye configuration and the third ac load voltage is single phase.

28. The power connect device set forth in claim 1, the power connect device further including:
   a low voltage relay in communication with the voltage protection circuit and adapted to open and close a dc load circuit providing the dc load voltage from the voltage protection circuit to the load device;
   wherein, when the voltage protection circuit determines the present nominal dc voltage level for the dc load voltage is outside the predetermined range, the voltage protection circuit disables the low voltage relay until the voltage protection circuit determines the present nominal dc voltage level is within the predetermined range for the predetermined time.

29. The power connect device set forth in claim 28 wherein the first nominal line voltage level is less than the second nominal line voltage level, wherein, if the ac line voltage is at the first nominal line voltage level, the first nominal load voltage level is compatible with a first voltage rating associated with the load device and the nominal dc voltage level is compatible with a dc voltage rating associated with the load device, wherein, if the ac line voltage is at the second nominal line voltage level, the first nominal load voltage level is not compatible with the first voltage rating associated with the load device and the nominal dc voltage level is not compatible with the dc voltage rating associated with the load device, wherein, if the ac line voltage is at the second nominal line voltage level, the voltage protection circuit determines that the-present nominal dc voltage level for the dc load voltage exceeds a predetermined threshold associated with an upper end of the predetermined range and disables the high voltage and low voltage relays.

30. The power connect device set forth in claim 28 wherein the first nominal line voltage level is less than the second nominal line voltage level, wherein, if the ac line voltage is at the second nominal line voltage level, the first nominal load voltage level is compatible with a first voltage rating associated with the load device and the nominal dc voltage level is compatible with a dc voltage rating associated with the load device, wherein, if the ac line voltage is at the first nominal line voltage level, the first nominal load voltage level is not compatible with the first voltage rating associated with the load device and the nominal dc voltage level is not compatible with the dc voltage rating associated with the load device, wherein, if the ac line voltage is at the first nominal line voltage level, the voltage protection circuit determines that the present nominal dc voltage level for the dc load voltage is less than a predetermined threshold associated with a lower end of the predetermined range and disables the high voltage and low voltage relays.

31. A power connect device adapted to receive ac line voltage and provide ac load voltage to a load device, including:
   a connect panel adapted to receive first and second input power conductors that provide the ac line voltage to the connect panel, the ac line voltage having a first nominal line voltage level or a second nominal line voltage level depending on a source of the ac line voltage;
   a transformer circuit in communication with the connect panel and adapted to produce a first ac load voltage at a first nominal load voltage level, the transformer circuit including a first transformer with a first primary winding, a first secondary winding adapted to produce the first ac load voltage, and a second secondary winding adapted to produce a second ac load voltage at a second nominal load voltage level, wherein the second nominal load voltage level is less than the first nominal load voltage level;
   a first secondary relay with a first secondary relay contact, wherein the first secondary relay contact is normally open, wherein the first secondary relay contact is in communication with the first secondary winding and adapted to open and close a first ac load circuit providing the first ac load voltage from the first secondary winding to the load device;
   a rectifier in communication with the transformer circuit and adapted to receive the second ac load voltage and produce a dc load voltage at a nominal dc voltage level; and
   an voltage protection circuit in communication with the rectifier and the first secondary relay, wherein the voltage protection circuit is adapted to receive the dc load voltage from the rectifier, wherein the voltage protection circuit determines if a present nominal dc voltage level for the dc load voltage is outside a predetermined range and disables the first secondary relay until the voltage protection circuit determines the present nominal dc voltage level is within the predetermined range for a predetermined time.

32. The power connect device set forth in claim 31 wherein the ac line voltage, first ac load voltage, and second ac load voltage are single phase.

33. The power connect device set forth in claim 31 wherein a nominal frequency level for the ac line voltage, first ac load voltage, and second ac load voltage is nominally 50 Hz or nominally 60 Hz.

34. The power connect device set forth in claim 31, the first primary winding including:
   first and second end terminals disposed at opposing ends of the first primary winding; and
   a first tap terminal disposed between the first and second end terminals;
   the connect panel including:
   first and second input power connections, the first input power connection connecting the first input power conductor to the first end terminal of the first primary winding and the second input power connection connecting the second input power conductor to one of the second end terminal and the first tap terminal.

35. The power connect-device set forth in claim 34 wherein the first nominal line voltage level is less than the second nominal line voltage level, wherein, if the ac line voltage is at the first nominal line voltage level and the second input power connection is connecting the second input power conductor to the first tap terminal, the first nominal load voltage level is compatible with a first voltage rating associated with the load device.

36. The power connect device set forth in claim 34 wherein the first nominal line voltage level is less than the second nominal line voltage level, wherein, if the ac line voltage is at the second nominal line voltage level and the second input power connection is connecting the second input power conductor to the second end terminal, the first nominal load voltage level is compatible with a first voltage rating associated with the load device.

37. The power connect device set forth in claim 34 wherein the first nominal line voltage level is less than the second nominal line voltage level, wherein, if the ac line voltage is at the second nominal line voltage level and the second input power connection is connecting the second input power conductor to the first tap terminal, the first nominal load voltage level is not compatible with a first voltage rating associated with the load device.

38. The power connect device set forth in claim 34 wherein the first nominal line voltage level is less than the second nominal line voltage level, wherein, if the ac line voltage is at the second nominal line voltage level and the second input power connection is connecting the second input power conductor to the first tap terminal, the voltage protection circuit determines that the present nominal dc voltage level for the dc load voltage exceeds a predetermined threshold associated with an upper end of the predetermined range and disables the first secondary relay.

39. The power connect device set forth in claim 34 wherein the first nominal line voltage level is less than the second nominal line voltage level, wherein, if the ac line voltage is at the first nominal line voltage level and the second input power connection is connecting the second input power conductor to the second end terminal, the voltage protection circuit determines that the present nominal dc voltage level for the dc load voltage is less than a predetermined threshold associated with a lower end of the predetermined range and disables the first secondary relay.

40. The power connect device set forth in claim 31 wherein the first nominal line voltage level is less than the second nominal line voltage level, wherein, if the ac line voltage is at the first nominal line voltage level, the first nominal load voltage level is compatible with a first voltage rating associated with the load device, wherein, if the ac line voltage is at the second nominal line voltage level, the first nominal load voltage level is not compatible with the first voltage rating associated with the load device, wherein, if the ac line voltage is at the second nominal line voltage level, the voltage protection circuit determines that the present nominal dc voltage level for the dc load voltage exceeds a predetermined threshold associated with an upper end of the predetermined range and disables the first secondary relay.

41. The power connect device set forth in claim 31 wherein the first nominal line voltage level is less than the second nominal line voltage level, wherein, if the ac line voltage is at the second nominal line voltage level, the first nominal load voltage level is compatible with a first voltage rating associated with the load device, wherein, if the ac line voltage is at the first nominal line voltage level, the first nominal load voltage level is not compatible with the first voltage rating associated with the load device, wherein; if the ac line voltage is at the first nominal line voltage level, the voltage protection circuit determines that the present nominal dc voltage level for the dc load voltage is less than a predetermined threshold associated with a lower end of the predetermined range and disables the first secondary relay.

42. The power connect device set forth in claim 31, the first transformer further including:
   a third secondary winding adapted to produce a third ac load voltage at a third nominal load voltage level; and
   the power connect device further including:
   a second secondary relay with a second secondary relay contact, wherein the second secondary relay contact is normally open, wherein the second secondary relay contact is in communication with the third secondary winding and adapted to open and close a third ac load circuit providing the third ac load voltage from the third secondary winding to the load device;
   wherein, when the voltage protection circuit determines the present nominal dc voltage level for the dc load voltage is outside the predetermined range, the voltage protection circuit disables the second secondary relay until the voltage protection circuit determines the present nominal dc voltage level is within the predetermined range for the predetermined time.

43. The power connect device set forth in claim 42 wherein the first nominal line voltage level is less than the second nominal line voltage level, wherein, if the ac line voltage is at the first nominal line voltage level, the first nominal load voltage level is compatible with a first voltage rating associated with the load device and the third nominal load voltage level is compatible with a second voltage rating associated with the load device, wherein, if the ac line voltage is at the second nominal line voltage level, the first nominal load voltage level is not compatible with the first voltage rating associated with the load device and the third nominal load voltage level is not compatible with the second voltage rating associated with the load device, wherein, if the ac line voltage is at the second nominal line voltage level, the voltage protection circuit determines that the present nominal dc voltage level for the dc load voltage exceeds a predetermined threshold associated with an upper end of the predetermined range and disables the first and second secondary relays.

44. The power connect device set forth in claim 42 wherein the first nominal line voltage level is less than the second nominal line voltage level, wherein, if the ac line voltage is at the second nominal line voltage level, the first nominal load voltage level is compatible with a first voltage rating associated with the load device and the third nominal load voltage level is compatible with a second voltage rating associated with the load device, wherein, if the ac line voltage is at the first nominal line voltage level, the first nominal load voltage level is not compatible with the first voltage rating associated with the load device and the third nominal load voltage level is not compatible with the second voltage rating associated with the load device, wherein, if the ac line voltage is at the first nominal line voltage level, the voltage protection circuit determines that the present nominal dc voltage level for the dc load voltage is less than a predetermined threshold associated with a lower end of the predetermined range and disables the first and second secondary relays.

45. The power connect device set forth in claim 31, the power connect device further including:
   a second secondary relay with a second secondary relay contact, wherein the second secondary relay contact is normally open, wherein the second secondary relay contact is in communication with the voltage protection circuit and adapted to open and close a dc load circuit providing the dc load voltage from the voltage protection circuit to the load device;

wherein, when the voltage protection circuit determines the present nominal dc voltage level for the dc load voltage is outside the predetermined range, the voltage protection circuit disables the second secondary relay until the voltage protection circuit determines the present nominal dc voltage level is within the predetermined range for the predetermined time.

46. The power connect device set forth in claim 45 wherein the first nominal line voltage level is less than the second nominal line voltage level, wherein, if the ac line voltage is at the first nominal line voltage level, the first nominal load voltage level is compatible with a first voltage rating associated with the load device and the nominal dc voltage level is compatible with a dc voltage rating associated with the load device, wherein, if the ac line voltage is at the second nominal line voltage level, the first nominal load voltage level is not compatible with the first voltage rating associated with the load device and the nominal dc voltage level is not compatible with the dc voltage rating associated with the load device, wherein, if the ac line voltage is at the second nominal line voltage level, the voltage protection circuit determines that the present nominal dc voltage level for the dc load voltage exceeds a predetermined threshold associated with an upper end of the predetermined range and disables the first and second secondary relays.

47. The power connect device set forth in claim 45 wherein the first nominal line voltage level is less than the second nominal line voltage level, wherein, if the ac line voltage is at the second nominal line voltage level, the first nominal load voltage level is compatible with a first voltage rating associated with the load device and the nominal dc voltage level is compatible with a dc voltage rating associated with the load device, wherein, if the ac line voltage is at the first nominal line voltage level, the first nominal load voltage level is not compatible with the first voltage rating associated with the load device and the nominal dc voltage level is not compatible with the dc voltage rating associated with the load device, wherein, if the ac line voltage is at the first nominal line voltage level, the voltage protection circuit determines that the present nominal dc voltage level for the dc load voltage is less than a predetermined threshold associated with a lower end of the predetermined range and disables the first and second secondary relays.

48. A method of protecting a load device from an overvoltage condition on at least a first ac load voltage provided to the load device, including:
 a) providing a power connect device adapted to receive an ac line voltage and provide the first ac load voltage to the load device;
 b) connecting the power connect device to the ac line voltage, wherein the ac line voltage is at a first nominal line voltage level or a second nominal line voltage level depending on the source of the ac line voltage, wherein the first nominal line voltage level is less than the second nominal line voltage level;
 c) producing the first ac load voltage at a first nominal load voltage level and a second ac load voltage at a second nominal load voltage level from the ac line voltage, wherein the second nominal load voltage level is less than the first nominal load voltage level;
 d) producing a dc load voltage at a nominal dc voltage level from the second ac load voltage;
 e) determining if a present nominal dc voltage level for the dc load voltage exceeds a predetermined threshold; and
 f) if the present nominal dc voltage level exceeds the predetermined threshold, disabling connection of the first ac load voltage to the load device, otherwise, connecting the first ac load voltage to the load device after the present nominal dc voltage level does not exceed the predetermined threshold for a predetermined time.

49. The method set forth in claim 48 wherein the power connect device is reconfigurable between a first phase configuration that adapts the power connect device to receive ac line voltage that is three phase and produce first and second ac load voltages that are three phase and a second phase configuration that adapts the power connect device to receive ac line voltage that is single phase and produce first and second ac load voltages that are single phase.

50. The method set forth in claim 49 wherein the power connect device is reconfigurable between a first voltage level configuration that adapts the power connect device to receive ac line voltage at the first nominal line voltage level and produce first ac load voltage at the first nominal load voltage level, second ac load voltage at the second nominal voltage level, and dc load voltage at the nominal dc voltage level and a second configuration that adapts the power connect device to receive ac line voltage at the second nominal line voltage level and produce first ac load voltage at the first nominal load voltage level, second ac load voltage at the second nominal voltage level, and dc load voltage at the nominal dc voltage level.

51. The method set forth in claim 50 wherein if the power connect device is configured for the first nominal line voltage level and the power connect device is connected to ac line voltage at the second nominal line voltage level, e) determines the present nominal dc voltage level for the dc load voltage exceeds the predetermined threshold and f) disables connection of the first ac load voltage to the load device.

52. The method set forth in claim 48 wherein the power connect device is reconfigurable between a first voltage level configuration that adapts the power connect device to receive ac line voltage at the first nominal line voltage level and produce first ac load voltage at the first nominal load voltage level, second ac load voltage at the second nominal voltage level, and dc load voltage at the nominal dc voltage level and a second configuration that adapts the power connect device to receive ac line voltage at the second nominal line voltage level and produce first ac load voltage at the first nominal load voltage level, second ac load voltage at the second nominal voltage level, and dc load voltage at the nominal dc voltage level.

53. The method set forth in claim 52 wherein if the power connect device is configured for the first nominal line voltage level and the power connect device is connected to ac line voltage at the second nominal line voltage level, the e) determines the present nominal dc voltage level for the dc load voltage exceeds the predetermined threshold and f) disables connection of the first ac load voltage to the load device.

54. A method of protecting a load device from an undervoltage condition on at least a first ac load voltage provided to the load device, including:
 a) providing a power connect device adapted to receive an ac line voltage and provide the first ac load voltage to the load device;
 b) connecting the power connect device to the ac line voltage, wherein the ac line voltage is at a first nominal line voltage level or a second nominal line voltage level depending on the source of the ac line voltage, wherein the first nominal line voltage level is less than the second nominal line voltage level;
c) producing the first ac load voltage at a first nominal load voltage level and a second ac load voltage at a second nominal load voltage level from the ac line voltage, wherein the second nominal load voltage level is less than the first nominal load voltage level;
d) producing a dc load voltage at a nominal dc voltage level from the second ac load voltage;
e) determining if a present nominal dc voltage level for the dc load voltage is less than a predetermined threshold; and
f) if the present nominal dc voltage level is less than the predetermined threshold, disabling connection of the first ac load voltage to the load device, otherwise, connecting the first ac load voltage to the load device after the present nominal dc voltage level is not less than the predetermined threshold for a predetermined time.

55. The method set forth in claim 54 wherein the power connect device is reconfigurable between a first phase configuration that adapts the power connect device to receive ac line voltage that is three phase and produce first and second ac load voltages that are three phase and a second phase configuration that adapts the power connect device to receive ac line voltage that is single phase and produce first and second ac load voltages that are single phase.

56. The method set forth in claim 55 wherein the power connect device is reconfigurable between a first voltage level configuration that adapts the power connect device to receive ac line voltage at the first nominal line voltage level and produce first ac load voltage at the first nominal load voltage level, second ac load voltage at the second nominal voltage level, and dc load voltage at the nominal dc voltage level and a second configuration that adapts the power connect device to receive ac line voltage at the second nominal line voltage level and produce first ac load voltage at the first nominal load voltage level, second ac load voltage at the second nominal voltage level, and dc load voltage at the nominal dc voltage level.

57. The method set forth in claim 56 wherein if the power connect device is configured for the second nominal line voltage level and the power connect device is connected to ac line voltage at the first nominal line voltage level, the e) determines the present nominal dc voltage level for the dc load voltage is less than the predetermined threshold and f) disables connection of the first ac load voltage to the load device.

58. The method set forth in claim 54 wherein the power connect device is reconfigurable between a first voltage level configuration that adapts the power connect device to receive ac line voltage at the first nominal line voltage level and produce first ac load voltage at the first nominal load voltage level, second ac load voltage at the second nominal voltage level, and dc load voltage at the nominal dc voltage level and a second configuration that adapts the power connect device to receive ac line voltage at the second nominal line voltage level and produce first ac load voltage at the first nominal load voltage level, second ac load voltage at the second nominal voltage level, and dc load voltage at the nominal dc voltage level.

59. The method set forth in claim 58 wherein if the power connect device is configured for the second nominal line voltage level and the power connect device is connected to ac line voltage at the first nominal line voltage level, the e) determines the present nominal dc voltage level for the dc load voltage is less than the predetermined threshold and f) disables connection of the first ac load voltage to the load device.

60. A power connect device adapted to receive ac line voltage and provide a first ac load voltage to a load device, including:
a connect panel adapted to receive at least two of first, second, and third input power conductors that provide the ac line voltage to the connect panel;
a transformer circuit in communication with the connect panel, the transformer circuit including:
a first transformer with a first primary winding and a first low voltage secondary winding;
a second transformer with a second primary winding and a second low voltage secondary winding; and
a third transformer with a third primary winding and a third low voltage secondary winding;
wherein the first, second, and third primary windings are adapted to receive the ac line voltage, wherein the first, second, and third low voltage secondary windings are adapted to produce a second ac load voltage at a nominal load voltage level;
a relay adapted apply the first ac load voltage to the load device;
a rectifier in communication with the transformer circuit and adapted to receive the second ac load voltage and produce a dc load voltage at a nominal dc voltage level; and
a voltage protection circuit in communication with the rectifier and the relay, wherein the voltage protection circuit is adapted to receive the dc load voltage from the rectifier, wherein the voltage protection circuit determines if a present nominal dc voltage level for the dc load voltage is at least one of: i) greater than a first predetermined upper threshold and ii) less than a second predetermined lower threshold, wherein the voltage protection circuit disables the relay until the voltage protection circuit determines the present nominal dc voltage level is one or more of: i) not greater than the first predetermined upper threshold and ii) not less than the second predetermined lower threshold for a predetermined time.

* * * * *